(12) United States Patent
Ono et al.

(10) Patent No.: US 12,466,786 B2
(45) Date of Patent: Nov. 11, 2025

(54) SEPARATION METHOD

(71) Applicant: AGC INC., Tokyo (JP)

(72) Inventors: Hikaru Ono, Tokyo (JP); Motoshi Aoyama, Tokyo (JP)

(73) Assignee: AGC INC., Tokyo (JP)

( * ) Notice: Subject to any disclaimer, the term of this patent is extended or adjusted under 35 U.S.C. 154(b) by 504 days.

(21) Appl. No.: 18/118,815

(22) Filed: Mar. 8, 2023

(65) Prior Publication Data

US 2023/0250052 A1 Aug. 10, 2023

Related U.S. Application Data

(63) Continuation of application No. PCT/JP2021/033805, filed on Sep. 14, 2021.

(30) Foreign Application Priority Data

Sep. 16, 2020 (JP) ................. 2020-155413

(51) Int. Cl.
*B01D 15/08* (2006.01)
*C07C 41/36* (2006.01)
*C07C 68/08* (2006.01)
*C07C 213/10* (2006.01)
*C07C 231/24* (2006.01)

(52) U.S. Cl.
CPC ............ *C07C 231/24* (2013.01); *B01D 15/08* (2013.01); *C07C 41/36* (2013.01); *C07C 68/08* (2013.01); *C07C 213/10* (2013.01)

(58) Field of Classification Search
CPC ......... B01D 15/08; C07C 41/36; C07C 68/08; C07C 213/10; C07C 231/24
See application file for complete search history.

(56) References Cited

U.S. PATENT DOCUMENTS

| 5,246,588 | A | * | 9/1993 | Tonelli | C08G 65/007 210/656 |
| 5,262,057 | A | * | 11/1993 | Tonelli | C08G 65/007 210/656 |
| 5,910,614 | A | * | 6/1999 | Turri | C08G 65/30 210/656 |
| 11,155,678 | B2 | * | 10/2021 | Naitou | C08G 65/30 |

FOREIGN PATENT DOCUMENTS

| CN | 105518054 A | 4/2016 | |
| EP | 3037455 A1 * | 6/2016 | ............ C08G 65/30 |
| JP | 6330960 B2 | 5/2018 | |

OTHER PUBLICATIONS

International Search Report issued Nov. 30, 2021 in PCT/JP2021/033805 (with English translation), 4 pages.

\* cited by examiner

*Primary Examiner* — Benjamin L Lebron
(74) *Attorney, Agent, or Firm* — Element IP, PLC

(57) ABSTRACT

To provide a method capable of separating a monofunctional species, bifunctional species, etc. of a fluorinated ether compound having a polyfluoropolyether chain and a predetermined functional group in good yield and with high separation performance.

A separation method for separating a compound represented by the formula (1) and a compound represented by the formula (2) from a mixture containing them by chromatography using a stationary phase and a mobile phase, wherein the mobile phase contains at least one type of specific solvent selected from a hydrofluoroolefin, a hydrochlorofluoroolefin, a chlorofluoroolefin, a cyclic hydrofluoroolefin, a cyclic hydrochlorofluoroolefin, a cyclic chlorofluoroolefin, a cyclic hydrofluorocarbon, a cyclic hydrochlorofluorocarbon, a cyclic chlorofluorocarbon and a perfluoroketone:

$$A\text{-}(OX)_m\text{—}O\text{—}Z\text{—}(R)_{n1} \quad \text{Formula (1)}$$

$$(R)_{n2}\text{—}Z\text{—}(OX)_m\text{—}O\text{—}Z\text{—}(R)_{n3} \quad \text{Formula (2)}$$

9 Claims, No Drawings

SEPARATION METHOD

TECHNICAL FIELD

The present invention relates to a separation method.

BACKGROUND ART

A fluorinated ether compound having a polyfluoropolyether chain and a reactive silyl group is suitable for a surface treatment agent, since it is capable of forming a surface layer on the surface of a base material that exhibits high lubricity and water and oil repellency. The surface treatment agent containing a fluorinated ether compound is used for applications that require long-term maintenance of performance (abrasion resistance) in which the water and oil repellency of the surface layer does not deteriorate easily even if the surface layer is repeatedly rubbed with a finger and performance (fingerprint stain removability) in which fingerprints on the surface layer can be easily removed by wiping, as a surface treatment agent for components constituting the finger-touch surface of touch panels, for eyeglass lenses, and for displays of wearable terminals.

In the synthesis of such a fluorinated ether compound, a fluorinated ether compound having a polyfluoropolyether chain and a functional group such as —OH, —CH=CH$_2$, —CH$_3$, —NH$_2$, —SH, -Ph (phenyl group), —F, —Cl, —Br, —I, —C(CH$_3$)=CH$_2$, —C(CF$_3$)=CH$_2$, —C≡CH, —CF=CH$_2$, —CH=CHF, —CF=CHF, —CH=CF$_2$, —CF=CF$_2$ or —N3, is an important compound as a raw material or intermediate.

It is generally desirable for the raw material or intermediate to have a higher purity. This is because by having a higher purity, the purification of the product obtained by the reaction becomes easy and further it is possible to reduce the formation of by-products or unidentified products that may occur in the reaction, and to obtain the target product with better performance. The raw material or intermediate is produced usually as a mixture of monofunctional species having a predetermined functional group at only one end (hereinafter referred to as "monofunctional species"), and bifunctional species having a predetermined functional group at both ends (hereinafter referred to as "bifunctional species"). Therefore, there is a need for a method that can easily separate the monofunctional species and the bifunctional species from the mixture of the raw material or intermediate.

The separation method described in Patent Document 1 is said to be capable of separating a perfluoro(poly)ether group-containing monoalcohol compound and a perfluoro (poly)ether group-containing dialcohol compound by using, as the mobile phase, one type of solvent selected from the group consisting of a hydrofluorocarbon, a hydrochlorofluorocarbon, a hydrofluoroether, a fluorinated ester solvent and a fluorinated aromatic solvent.

PRIOR ART DOCUMENT

Patent Document

Patent Document 1: Japanese Patent No. 6,330,960

DISCLOSURE OF INVENTION

Technical Problem

In the separation method described in Patent Document 1, it is said to be preferred to use, among others, HCFC-225 (CF$_3$CF$_2$CHCl$_2$, CClF$_2$CF$_2$CHClF) as the mobile phase. However, recently, there has been a demand for further improvement in the separation performance of monofunctional species and bifunctional species of the fluorinated ether compound, and it has become clear that the separation performance between monofunctional species and bifunctional species is not sufficient with the technology using HCFC-225 as the mobile phase as described in Patent Document 1.

The present invention has been made in view of the above problem, and has an object to provide a method which is capable of separating monofunctional species and bifunctional species of a fluorinated ether compound having a polyfluoropolyether chain and a predetermined functional group in good yield and with high separation performance.

Solution to Problem

The present invention has the following embodiments.

[1] A separation method for separating a compound represented by the following formula (1) and a compound represented by the following formula (2) from a mixture containing them by chromatography using a mobile phase and a stationary phase, which comprises a step of supplying the mixture to the stationary phase of the chromatography to let it be adsorbed on the stationary phase, and a step of supplying, to the stationary phase having the mixture adsorbed thereon, a mobile phase containing at least one type of specific solvent selected from the group consisting of a hydrofluoroolefin, a hydrochlorofluoroolefin, a chlorofluoroolefin, a cyclic hydrofluoroolefin, a cyclic hydrochlorofluoroolefin, a cyclic chlorofluoroolefin, a cyclic hydrofluorocarbon, a cyclic chlorofluorocarbon and a perfluoroketone:

   Formula (1)

   Formula (2)

where

A is an alkyl group or a fluoroalkyl group,

X is an alkylene group or a fluoroalkylene group having one or more fluorine atoms, m is an integer of 2 or more, Z is a (n1+1)-valent, (n2+1)-valent or (n3+1)-valent linking group, R is any functional group selected from the group consisting of —OH, —CR$^1$=CR$^2$R$^3$ (where R$^1$ is a hydrogen atom, a fluorine atom, a methyl group or a trifluoromethyl group, and R$^2$ and R$^3$ are each independently a hydrogen atom or a fluorine atom), —CH$_3$, —NH$_2$, —SH, -Ph, —F, —Cl, —Br, —I, —C≡CH and —N3.

n1 is an integer of 1 or more, n2 is an integer of 1 or more, and n3 is an integer of 1 or more.

[2] The separation method according to [1], wherein in the above formulas (1) and (2), A is a fluoroalkyl group, and X is a fluoroalkylene group having one or more fluorine atoms.

[3] The separation method according to [1] or [2], wherein in the above formulas (1) and (2), n1, n2 and n3 are the same integers.

[4] The separation method according to any one of [1] to [3], wherein the mixture further contains a compound represented by the following formula (3), and it is separated into the compound represented by the formula (1), the compound represented by the formula (2), and the compound represented by the formula (3):

    Formula (3)

where A, X, and m are the same as those in the above formulas (1) and (2).

[5] The separation method according to any one of [1] to [4], wherein the specific solvent is a solvent that does not contain chlorine atoms.

[6] The separation method according to any one of [1] to [5], wherein the specific solvent includes at least one type selected from the group consisting of a hydrofluoroolefin, a cyclic hydrofluoroolefin and a cyclic hydrofluorocarbon.

[7] The separation method according to any one of [1] to [6], wherein in the above formulas (1), (2) and (3), $(OX)_m$ contains the following structure:

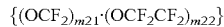

where m21 is an integer of 1 or more, m22 is an integer of 1 or more, and m21+m22 is an integer of from 2 to 500.

[8] The separation method according to any one of [1] to [7], wherein the stationary phase is selected from the group consisting of aluminum oxide, silica gel, magnesium oxide, aluminum silicate, magnesium silicate, chemically modified silica gel and diatomaceous earth.

[9] The separation method according to any one of [1] to [8], wherein the chromatography is column chromatography.

Advantageous Effects of Invention

According to the present invention, it is possible to provide a method capable of achieving separation of monofunctional species and bifunctional species of a fluorinated ether compound having a polyfluoropolyether chain and a predetermined functional group, as well as separation of 0-functional species, monofunctional species and bifunctional species of the above-mentioned fluorinated ether compound, in good yield and with high separation performance.

EMBODIMENTS OF INVENTION

In this specification, a compound represented by the formula (1) is referred to also as a compound (1). Compounds, etc. represented by other formulas are referred to also in the same manner. A group represented by the formula (2) is referred to also as a group 2. Groups represented by other formulas are referred to also in the same manner.

In this specification, in a case where "an alkylene group may have an A group", the alkylene group may have an A group between carbon-carbon atoms in the alkylene group, or may have an A group at the terminal like an alkylene group-A group-.

The expression "to" indicating a numerical range means that the numerical values listed before and after it are included as the lower and upper limit values.

(Target Mixture to be Separated)

The separation method of the present invention is a method for separating a compound represented by the following formula (1) and a compound represented by the following formula (2) from a mixture containing them (hereinafter simply referred to as a "mixture") by chromatography using a mobile phase and a stationary phase. Specifically, it is a separation method for separating a compound (1) and a compound (2) by chromatography using a mobile phase and a stationary phase. Namely, the separation method of the present invention is suitable as a production method of a compound (1). Further, the separation method of the present invention is also suitable as a production method of a compound (2).

In the present invention, the compound (1) is called monofunctional species since it has a functional group "R" at one terminal, and the compound (2) is called bifunctional species since it has functional groups "R" at both terminals. The ratio of the compound (1) to the compound (2) contained in the mixture is not particularly limited, but, for example, the ratio (on a mass basis) of the compound (1)/the compound (2) is from 20 to 0.05.

    Formula (1)

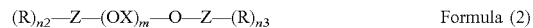    Formula (2)

Here, in the formulas (1) and (2), the definitions of the respective symbols are as follows.

A is an alkyl group or a fluoroalkyl group.

X is an alkylene group or a fluoroalkylene group having one or more fluorine atoms, and m is an integer of 2 or more.

Z is a (n1+1)-valent, (n2+1)-valent or (n3+1)-valent linking group.

R is any functional group selected from the group consisting of $-OH$, $-CR^1=CR^2R^3$ (where $R^1$ is a hydrogen atom, a fluorine atom, a methyl group or a trifluoromethyl group, and $R^2$ and $R^3$ are each independently a hydrogen atom or a fluorine atom), $-CH_3$, $-NH_2$, $-SH$, -Ph (phenyl group), $-F$, $-Cl$, $-Br$, $-I$, $-C\equiv CH$ and $-N_3$, n1 is an integer of 1 or more, n2 is an integer of 1 or more, n3 is an integer of 1 or more, and n1, n2 and n3 represent the same integers.

The number of carbon atoms in the alkyl group or the fluoroalkyl group for A is preferably from 1 to 20, more preferably from 1 to 10, further preferably from 1 to 6, particularly preferably from 1 to 3. The alkyl group or the fluoroalkyl group may be linear or branched.

As A, a fluoroalkyl group is preferred, and a perfluoroalkyl group is more preferred.

As the alkyl group, a methyl group, an ethyl group, a n-propyl group, an isopropyl group or the like may be mentioned. As the fluoroalkyl group, $CHF_2-$, $CH_2F-$, $CF_3CH_2-$, $CF_3CH_2CH_2-$ or the like may be mentioned.

As the perfluoroalkyl group, $CF_3-$, $CF_3CF_2-$, $CF_3CF_2CF_2-$, $CF_3CF_2CF_2CF_2-$, $CF_3CF_2CF_2CF_2CF_2-$, $CF_3CF_2CF_2CF_2CF_2CF_2-$, $CF_3CF(CF_3)-$ or the like may be mentioned.

As the perfluoroalkyl group, $CF_3-$, $CF_3CF_2-$ or $CF_3CF_2CF_2-$ is preferred.

The number of carbon atoms in the alkylene group and the fluoroalkylene group for X is preferably from 1 to 6, more preferably from 2 to 6, particularly preferably from 2 to 4.

The alkylene group and the fluoroalkylene group may be linear, branched or cyclic.

When X is an alkylene group and a fluoroalkylene group, the ratio of the fluoroalkylene group to the repeating number m is preferably 50% or more, more preferably 80% or more, particularly preferably 100%.

The number of fluorine atoms in the fluoroalkylene group, is preferably from 1 to 2 times, more preferably from 1.7 to 2 times, the number of carbon atoms.

The fluoroalkylene group is particularly preferably a group having all hydrogen atoms in the fluoroalkylene group replaced by fluorine atoms (a perfluoroalkylene group).

Specific examples of (OX) include $-OCH_2-$, $-OCHF-$, $-OCF_2CHF-$, $-OCHFCF_2-$, —$OCF_2CH_2$—, —$OCH_2CF_2$—, —$OCF_2CF_2CHF$—, —$OCHFCF_2CF_2$—, —$OCF_2CF_2CH_2$—, —$OCH_2CF_2CF_2$—, —$OCF_2CF_2CF_2CH_2$—, —$OCH_2CF_2CF_2CF_2$—, —$OCF_2CF_2CF_2CF_2CH_2$—, —$OCH_2CF_2CF_2CF_2CF_2$—, —$OCF_2CF_2CF_2CF_2CF_2CH_2$—, —$OCH_2CF_2CF_2CF_2CF_2CF_2$—, —$OCF_2$—, —$OCF_2CF_2$—, —$OCF_2CF_2CF_2$—, —$OCF(CF_3)CF_2$—, —$OCF_2CF_2CF_2CF_2$—, —$OCF(CF_3)CF_2CF_2$—, —$OCF_2CF_2CF_2CF_2CF_2$—, —$OCF_2CF_2CF_2CF_2CF_2CF$—, —$O\text{-cyclo}C_4F_6$—, —$O\text{-cyclo}C_5F_8$—and —$O\text{-cyclo}C_6F_{10}$—.

Here, -$\text{cyclo}C_4F_6$— means a perfluorocyclobutanediyl group, and as its specific example, a perfluorocyclobutane-1,2-diyl group may be mentioned. -$\text{cyclo}C_5F_8$— means a perfluorocyclopentanediyl group, and as its specific example, a perfluorocyclopentane-1,3-diyl group may be mentioned. -$\text{cyclo}C_6F_{10}$— means a perfluorocyclohexanediyl group, and as its specific example, a perfluorocyclohexane-1,4-diyl group may be mentioned.

The repeating number m of (OX) is an integer of 2 or more, preferably an integer of from 2 to 200, more preferably an integer of from 5 to 150, further preferably from 5 to 100, particularly preferably from 10 to 50.

$(OX)_m$ as the main chain repeating structure may contain only one type of (OX) or may contain two or more types of (OX). The bonding order of two or more types of (OX) is not limited and may be arranged randomly, alternately or in blocks.

Containing two or more types of (OX) means that in a compound, two or more types of (OX) different in the number of carbon atoms are present, two or more types of (OX) different in the number of hydrogen atoms are present, and/or two or more types of (OX) different in the presence or absence of side chains, or in the type of side chains (such as the number of side chains or the number of carbon atoms in the side chains) even if the number of carbon atoms is the same.

With respect to the arrangement of two or more types of (OX), for example, the structure represented by $\{(OCF_2)_{m21}\cdot(OCF_2CF_2)_{m22}\}$ shows that m21 ($OCF_2$) and m22 ($OCF_2CF_2$) are randomly arranged. Further, the structure represented by $(OCF_2CF_2—OCF_2CF_2CF_2CF_2)_{m25}$ shows that m25 ($OCF_2CF_2$) and m25 ($OCF_2CF_2CF_2CF_2$) are arranged alternately.

As $(OX)_m$,
$[(OCH_{ma}F_{(2-ma)})_{m11}\cdot(OC_2H_{mb}F_{(4-mb)})_{m12}\cdot(OC_3H_{mc}F_{(6-mc)})_{m13}\cdot(OC_4H_{md}F_{(8-md)})_{m14}\cdot(OC_5H_{me}F_{(10-me)})_{m15}\cdot(OC_6H_{mf}F_{(12-mf)})_{m16}\cdot(O\text{-cyclo}C_4H_{mg}F_{(6-mg)})_{m17}\cdot(O\text{-cyclo}C_5H_{mh}F_{(8-mh)})_{m18}\cdot(O\text{-cyclo}C_6H_{mi}F_{(10-mi)})_{m19}]$ is preferred.

Here, -$\text{cyclo}C_4H_{mg}F_{(6-mg)}$ represents a fluorocyclobutanediyl group, and a fluorocyclobutane-1,2-diyl group is preferred. -$\text{cyclo}C_5H_{mh}F_{(8-mh)}$ represents a fluorocyclopentanediyl group, and a fluorocyclopentane-1,3-diyl group is preferred. -$\text{cyclo}C_6H_{mi}F_{(10-mi)}$ represents a fluorocyclohexanediyl group, and a fluorocyclohexane-1,4-diyl group is preferred.

ma is 0 or 1, mb is an integer of from 0 to 3, and mc is an integer if from 0 to 5, md is an integer of from 0 to 7, me is an integer of from 0 to 9, mf is an integer of from 0 to 11, mg is an integer of from 0 to 5, mh is an integer of from 0 to 7, and mi is an integer of from 0 to 9.

m11, m12, m13, m14, m15, m16, m17, m18 and m19 are each independently an integer of 0 or more, and preferably at most 100.

m11+m12+m13+m14+m15+m16+m17+m18+m19 is an integer of 2 or more, preferably an integer of from 2 to 200, more preferably an integer of from 5 to 150, further preferably an integer of from 5 to 100, particularly preferably an integer of from 10 to 50.

Among them, m12 is preferably an integer of 2 or more, particularity preferably an integer of from 2 to 200.

Further, $C_3H_{mc}F_{(6-mc)}$, $C_4H_{md}F_{(8-md)}$, $C_5H_{me}F_{(10-me)}$ and $C_6H_{mf}F_{(12-mf)}$ may be linear or branched, and are preferably linear.

Further, the bonding order of m11 ($OCH_{ma}F_{(2-ma)}$), m12 ($OC_2H_{mb}F_{(4-mb)}$), m13 ($OC_3H_{mc}F_{(6-mc)}$), m14 ($OC_4H_{md}F_{(8-md)}$), m15 ($OC_5H_{me}F_{(10-me)}$), m16 ($OC_6H_{mf}F_{(12-mf)}$), m17 ($O\text{-cyclo}C_4H_{mg}F_{(6-mg)}$), m18 ($O\text{-cyclo}C_5H_{mh}F_{(8-mh)}$) or m19 ($O\text{-cyclo}C_6H_{mi}F_{(10-mi)}$) is not limited.

In a case where m11 is 2 or more, multiple ($OCH_{ma}F_{(2-ma)}$) may be the same or different.
In a case where m12 is 2 or more, multiple ($OC_2H_{mb}F_{(4-mb)}$) may be the same or different.
In a case where m13 is 2 or more, multiple ($OC_3H_{mc}F_{(6-mc)}$) may be the same or different.
In a case where m14 is 2 or more, multiple ($OC_4H_{md}F_{(8-md)}$) may be the same or different.
In a case where m15 is 2 or more, multiple ($OC_5H_{me}F_{(10-me)}$) may be the same or different.
In a case where m16 is 2 or more, multiple ($OC_6H_{mf}F_{(12-mf)}$) may be the same or different.
In a case where m17 is 2 or more, multiple ($O\text{-cyclo}C_4H_{mg}F_{(6-mg)}$) may be the same or different.
In a case where m18 is 2 or more, multiple ($O\text{-cyclo}C_5H_{mh}F_{(8-mh)}$) may be the same or different.
In a case where m19 is 2 or more, multiple ($O\text{-cyclo}C_6H_{mi}F_{(10-mi)}$) may be the same or different.

$(OX)_m$ is preferably one having any one of the following structures.
$\{(OCF_2)_{m21}\cdot(OCF_2CF_2)_{m22}\}$,
$(OCF_2CF_2)_{m23}$,
$(OCF_2CF_2CF_2)_{m24}$,
$(OCF_2CF_2—OCF_2CF_2CF_2CF_2)_{m25}$,
$\{(OCF_2CF_2CF_2CF_2CF_2)_{m26}\cdot(OCF_2)_{m27}\}$,
$\{(OCF_2CF_2CF_2CF_2CF_2)_{m26}\cdot(OCF_2CF_2)_{m27}\}$,
$\{(OCF_2CF_2CF_2CF_2CF_2)_{m26}\cdot(OCF_2)_{m27}\}$,
$\{(OCF_2CF_2CF_2CF_2CF_2)_{m26}\cdot(OCF_2CF_2)_{m27}\}$,
$(OCF_2CF_2CF_2CF_2—OCF_2)_{m28}$,
$(OCF_2CF_2CF_2CF_2—OCF_2CF_2)_{m28}$,
$(OCF_2CF_2CF_2CF_2CF_2—OCF_2)_{m28}$,
$(OCF_2CF_2CF_2CF_2CF_2—OCF_2CF_2)_{m28}$,
$(OCF_2—OCF_2CF_2CF_2CF_2)_{m28}$,
$(OCF_2—OCF_2CF_2CF_2CF_2CF_2)_{m28}$,
$(OCF_2CF_2—OCF_2CF_2CF_2CF_2)_{m28}$,
$(OCF_2CF_2—OCF_2CF_2CF_2CF_2CF_2)_{m28}$.

Here, m21 is an integer of 1 or more, m22 is an integer of 1 or more, m21+m22 is an integer of from 2 to 500, m23 and m24 are each independently an integer of from 2 to 500, m25 is an integer of from 1 to 250, m26 and m27 are each independently an integer of 1 or more, and m26+m27 is an integer of from 2 to 500, and m28 is an integer of from 1 to 250.

$(OX)_m$ is more preferably one of the following structures.
$\{(OCF_2)_{m21}\cdot(OCF_2CF_2)_{m22}\}$,
$(OCF_2CF_2CF_2)_{m24}$,
$(OCF_2CF_2)_2\{(OCF_2)_{m21}\cdot(OCF_2CF_2)_{m22-2}\}$,
$(OCF_2CF_2—OCF_2CF_2CF_2CF_2)_{m25-1}OCF_2CF_2$,
$(OCF_2CF_2CF_2CF_2—OCF_2)_{m28}$,
$(OCF_2CF_2CF_2CF_2CF_2—OCF_2)_{m28}$,
$(OCF_2CF_2—OCF_2CF_2CF_2CF_2)_{m28-1}OCF_2CF_2$,
$(OCF_2CF_2—OCF_2CF_2CF_2CF_2CF_2)_{m28-1}OCF_2CF_2$.

Here, with respect to m22-2, m25-1 and m28-1, the numbers of m22, m25 and m28 are selected so that they become integers of 1 or more.

Among these, the case where $(OX)_m$ is $\{(OCF_2)_{m21} \cdot (OCF_2CF_2)_{m22}\}$ is preferred because it is possible to separate compound (1) and compound (2) from the mixture with higher purity.

In $\{(OCF_2)_{m21} \cdot (OCF_2CF_2)_{m22}\}$, m22/m21 is preferably from 0.1 to 10, more preferably from 0.2 to 5.0, further preferably from 0.2 to 2.0, particularly preferably from 0.2 to 1.5, most preferably from 0.2 to 0.85.

The number average molecular weight of $(OX)_m$ is preferably from 1,000 to 20,000, more preferably from 2,000 to 15,000, particularly preferably from 2,500 to 10,000.

Z is a (n1+1)-valent, (n2+1)-valent or (n3+1)-valent linking group. n1, n2 and n3 are each independently an integer of from 1 to 10. Thus, Z is a 2 to 11-valent linking group.

Z preferably has at least one type of branching point (hereinafter referred to as "branching point P") selected from the group consisting of C, N, Si, a ring structure and a (n1+1)-valent, (n2+1)-valent or (n3+1)-valent organopolysiloxane residue.

As the ring structure, one type selected from the group consisting of a 3 to 8 membered aliphatic ring, a 3 to 8 membered aromatic ring, a 3 to 8 membered hetero ring, and a fused ring consisting of two or more of these rings, is preferred, and the ring structures listed in the following formulas are particularly preferred.

The ring structure may have a substituent such as a halogen atom, an alkyl group (which may contain an etheric oxygen atom between carbon-carbon atoms), a cycloalkyl group, an alkenyl group, an allyl group, an alkoxy group or an oxo group (=O).

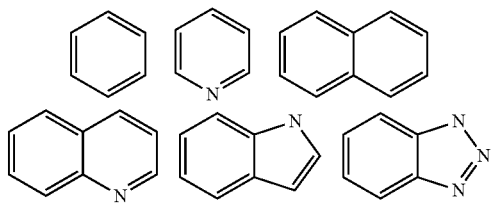

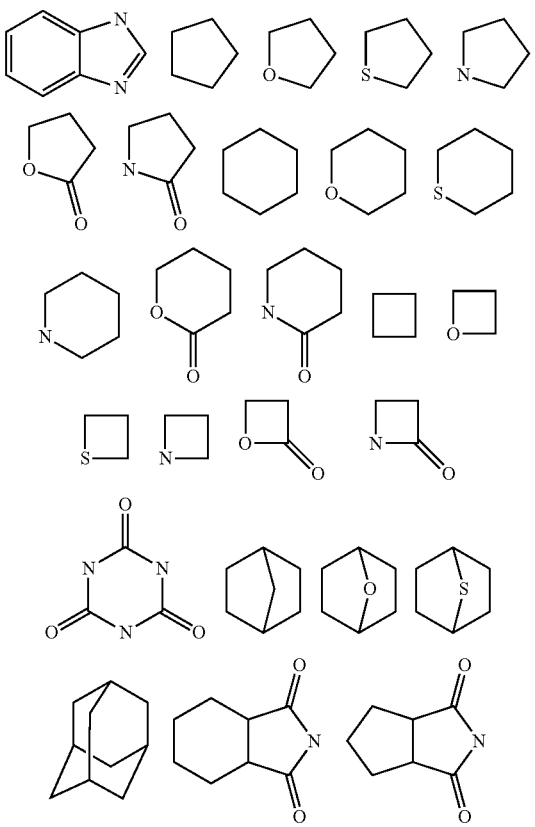

As specific examples of the (n1+1)-valent, (n2+1)-valent or (n3+1)-valent organopolysiloxane residue, the following groups may be mentioned.

Here, $R^5$ in the following formulas is a hydrogen atom, an alkyl group, an alkoxy group, or a phenyl group. The number of carbon atoms in the alkyl and the alkoxy group for $R^5$ is preferably from 1 to 10, particularly preferably 1.

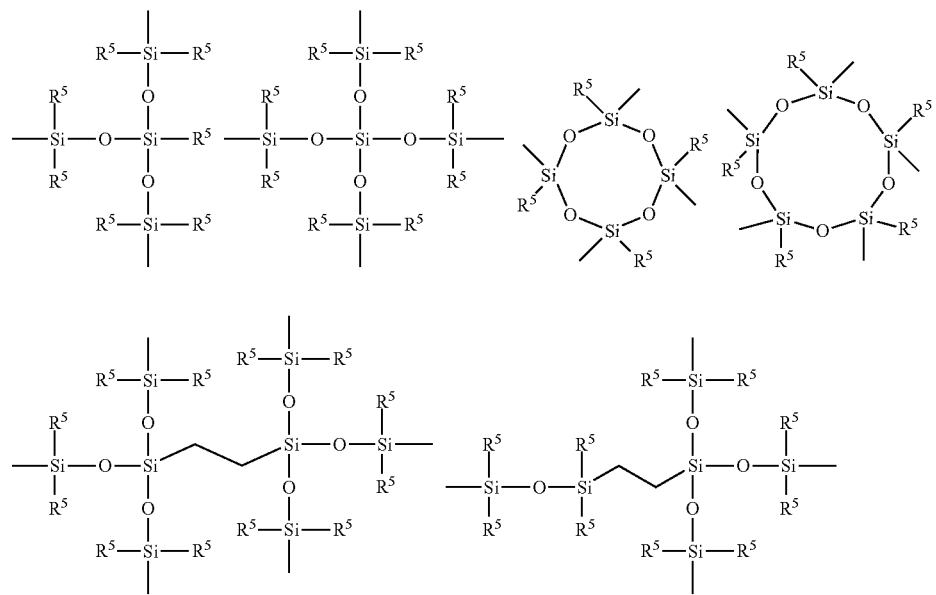

-continued

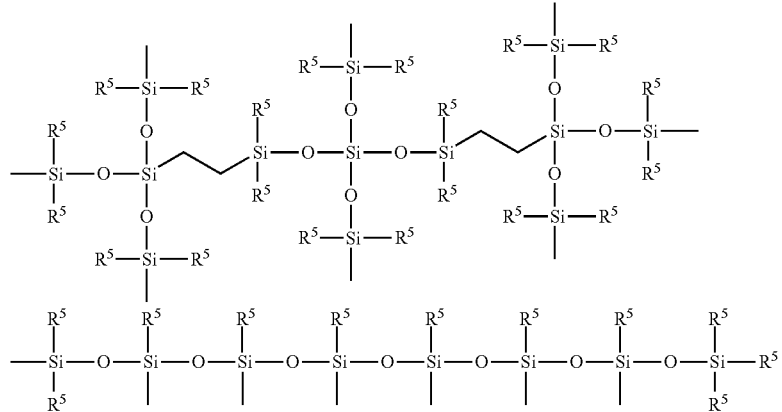

Z may have at least one type of group selected from the group consisting of an alkylene group, a fluoroalkylene group, a hydroxyalkylene group, an alkoxyalkylene group, a carbonyl group, an amide bond, an ether bond, a thioether bond, an urea bond, an urethane bond, a carbonate bond, an ester bond, $-SO_2NR^6-$, $-Si(R^6)_2-$, $-OSi(R^6)_2-$, $-Si(CH_3)_2-Ph-Si(CH_3)_2-$ and a divalent organopolysiloxane residue.

Here, $R^6$ is a hydrogen atom, a $C_{1-6}$ alkyl group or a phenyl group, and Ph is a phenylene group. The number of carbon atoms in the alkyl group for $R^6$ is preferably from 1 to 3, particularly preferably from 1 to 2, from such a viewpoint that the compound can easily be produced.

Each bond or group constituting Z may have, in the case of the formula (1), any of its terminals arranged on the A side. For example, an amide bond may have the carbon atom positioned on the A side and may have the nitrogen atom positioned on the A side. The same is true for other bonds or groups.

As specific examples of the divalent organopolysiloxane residue, groups of the following formulas may be mentioned. Here, $R^7$ in the following formulas is a hydrogen atom, an alkyl group, an alkoxy group or a phenyl group. The number of carbon atoms in the alkyl group and the alkoxy group for $R^7$ is preferably from 1 to 10, particularly preferably 1.

As Z, a combination of two or more divalent hydrocarbon groups and one or more branching points P, or a combination of two or more divalent hydrocarbon groups, one or more branching points P and one or more bonds B, may be mentioned.

Specific examples of the divalent hydrocarbon group include a divalent aliphatic hydrocarbon group (such as an alkylene group or a cycloalkylene group) and a divalent aromatic hydrocarbon group (such as a phenylene group). The number of carbon atoms in the divalent hydrocarbon group is preferably from 1 to 10, more preferably from 1 to 6, particularly preferably from 1 to 4.

Z in the formula (1) may be the following group g2-1 (where d1+d3=1 (i.e. d1 or d3 is 0), n1=d2+d4, d2+d4≥1), group g2-2 (where e1=1, n1=e2, e2≥1), group g2-3 (where n1=2), group g2-4 (where h1=1, n1=h2, h2≥1), group g2-5 (where i1=1, n1=i2, i2≥1), group g2-6 (where n1=1), group g2-7 (where n1=i3+1, i3≥1), group g2-8 (where n1=i4, i4≥1) or group g2-9 (where n1=i5, i5≥1).

Z in formula (2) may each independently be the following group g2-1 (where n2=d2+d4, n3=d2+d4), group g2-2 (where e1=1, n2=e2, n3=e2), group g2-3 (where n2=2, n3=2), group g2-3 (where n2=2, n3=2), group g2-4 (where h1=1, n2=h2, n3 5=h2), group g2-5 (where i1=1, n2=i2, n3=i2), group g2-6 (where n2=1, n3=1), group g2-7 (where n2=i3+1, n3=i3+1), group g2-8 (where n2=i4, n3=i4) or group g2-9 (where n2=i5, n3=i5).

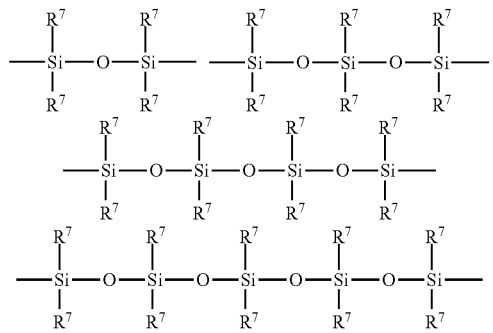

Z preferably has at least one type of bond selected from the group consisting of $-C(O)NR^6-$, $-C(O)-$, $-C(O)O-$, $-NR^6-$ and $-O-$, and particularly preferably has $-C(O)NR^6-$, since compound (1) and compound (2) can be separated to a higher degree of purity.

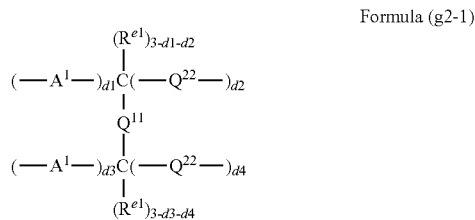

$(R^{e1})_{3-d1-d2}$
$(-A^1-)_{d1}C(-Q^{22}-)_{d2}$
$Q^{11}$
$(-A^1-)_{d3}C(-Q^{22}-)_{d4}$
$(R^{e1})_{3-d3-d4}$        Formula (g2-1)

$(-A^1-)_{e1}C(R^{e2})_{4-e1-e2}(-Q^{22}-)_{e2}$        Formula (g2-2)

$-A^1-N(-Q^{23}-)_2$        Formula (g2-3)

$(-A^1-)_{h1}Z^1(-Q^{24}-)_{h2}$        Formula (g2-4)

$(-A^1-)_{i1}Si(R^{e3})_{4-i1-i2}(-Q^{25}-)_{i2}$        Formula (g2-5)

$-A^1-Q^{26}-$        Formula (g2-6)

-A¹-CH(-Q²²-)—Si(Rᵉ³)₃₋ᵢ₃(-Q²⁵-)ᵢ₃    Formula (g2-7)

-A¹-[CH₂C(Rᵉ⁴)(-Q²⁷-)]ᵢ₄—Rᵉ⁵    Formula (g2-8)

-A¹—Zᵃ(-Q²⁸-)ᵢ₅    Formula (g2-9)

Here, in the formulas (g2-1) to (g2-9), $A^1$ is connected to the $(OX)_m$ side, and $Q^{22}$, $Q^{23}$, $Q^{24}$, $Q^{25}$, $Q^{26}$, $Q^{27}$ and $Q^{28}$ are connected to the R side.

$A^1$ is a single bond, an alkylene group, a group having —C(O)NR⁶—, —C(O)—, —OC(O)—, —OC(O)O—, —NHC(O)O—, —NHC(O)NR⁶—, —O—, —SO₂NR⁶—or —N(R⁶)SO₂—between carbon-carbon atoms of an alkylene group having two or more carbon atoms, or a group having —C(O)NR⁶—, —C(O)—, —OC(O)—, —OC(O)O—, —NHC(O)O—, —NHC(O)NR⁶—, —O—, —SO₂NR⁶—or —N(R⁶)SO₂—at the terminal on the side of the alkylene group not connected to A (opposite side to the A side), and in each formula, in a case where two or more $A^1$ are present, the two or more $A^1$ may be the same or different. Hydrogen atoms of the alkylene group may be replaced by fluorine atoms.

$Q^{11}$ is a single bond, —O—, an alkylene group, or a group having —C(O)NR⁶—, —C(O)—, —NR⁶— or —O—between carbon-carbon atoms of an alkylene group having two or more carbon atoms.

$Q^{22}$ is an alkylene group, a group having —C(O)NR⁶—, —C(O)—, —NR⁶— or —O—between carbon-carbon atoms of an alkylene group having two or more carbon atoms, a group having —C(O)NR⁶—, —C(O)—, —NR⁶— or —O— at the terminal of the A side of the alkylene group, or a group having —C(O)NR⁶—, —C(O)—, —NR⁶— or —O—between carbon-carbon atoms of an alkylene group having two or more carbons and having —C(O)NR⁶—, —C(O)—, —NR⁶— or —O— at the terminal on the A side, and in each formula, in a case where two or more $Q^{22}$ are present, the two or more $Q^{22}$ may be the same or different.

$Q^{23}$ is an alkylene group, or a group having —C(O)NR⁶—, —C(O)—, —NR⁶— or —O—between carbon-carbon atoms of an alkylene group having two or more carbon atoms, and two $Q^{23}$ may be the same or different.

$Q^{24}$ is an alkylene group, or a group having —C(O)NR⁶—, —C(O)—, —NR⁶— or —O—between carbon-carbon atoms of an alkylene group having two or more carbon atoms, and in each formula, in a case where two or more $Q^{24}$ are present, the two or more $Q^{24}$ may be the same or different.

$Q^{25}$ is an alkylene group, or a group having —C(O)NR⁶—, —C(O)—, —NR⁶—or —O—between carbon-carbon atoms of an alkylene group having two or more carbon atoms, and in each formula, in a case where two or more $Q^{25}$ are present, the two or more $Q^{25}$ may be the same or different.

$Q^{26}$ is an alkylene group, or a group having —C(O)NR⁶—, —C(O)—, —NR⁶— or —O—between carbon-carbon atoms of an alkylene group having two or more carbon atoms.

$R^6$ is a hydrogen atom, a $C_{1-6}$ alkyl group or a phenyl group.

$Q^{27}$ is a single bond or an alkylene group.

$Q^{28}$ is an alkylene group, or a group having an etheric oxygen atom or a divalent organopolysiloxane residue between carbon-carbon atoms of an alkylene group having two or more carbon atoms.

$Z^1$ is a group having a h1+h2-valent ring structure having a carbon atom or a nitrogen atom to which $A^1$ is directly bonded and having a carbon atom or a nitrogen atom to which $Q^{24}$ is directly bonded.

$R^{e1}$ is a hydrogen atom or an alkyl group, and in each formula, in a case where two or more $R^{e1}$ are present, the two or more $R^{e1}$ may be the same or different.

$R^{e2}$ is a hydrogen atom, a hydroxy group, an alkyl group or an acyloxy group.

$R^{e3}$ is an alkyl group.

$R^{e4}$ is a hydrogen atom or an alkyl group, preferably a hydrogen atom from such a viewpoint that the compound can easily be produced. In each formula, in a case where two or more $R^{e4}$ are present, the two or more $R^{e4}$ may be the same or different.

$R^{e5}$ is a hydrogen atom or a halogen atom, preferably a hydrogen atom from such a viewpoint that the compound can easily be produced.

d1 is an integer of from 0 to 3, preferably 1 or 2. d2 is an integer of from 0 to 3, preferably 1 or 2. d1+d2 is an integer of from 1 to 3.

d3 is an integer of from 0 to 3, preferably 0 or 1. d4 is an integer of from 0 to 3, preferably 2 or 3. d3+d4 is an integer of from 1 to 3.

d1+d3 is 1.

d2+d4 is, in Z of the formula (1), an integer of from 1 to 5, preferably 4 or 5, and, in Z of the formula (2), an integer of from 1 to 5, preferably an integer of from 3 to 5, particularly preferably 4 or 5.

e1+e2 is 3 or 4. e1 is 1. e2 is, in Z of the formula (1), from 1 to 3, preferably 2 or 3, and, in Z of the formula (2), from 1 to 3, preferably 2 or 3.

h1 is 1. h2 is an integer of 1 or more (preferably 2 or 3).

i1+i2 is from 2 to 4 (preferably 3 or 4). i1 is 1. i2 is an integer of from 1 to 3 (preferably 2 or 3).

i3 is an integer of from 0 to 3, preferably from 1 to 3, particularly preferably 2 or 3.

i4 is, in Z of the formula (1), 1 or more (preferably an integer of from 2 to 10. particularly preferably an integer of from 2 to 6) and, in Z of the formula (2), 1 or more (preferably an integer of from 1 to 10, particularly preferably an integer of from 1 to 6).

i5 is 1 or more (preferably an integer of from 2 to 7).

The number of carbon atoms in the alkylene group for $Q^{22}$, $Q^{23}$, $Q^{24}$, $Q^{25}$, $Q^{26}$, $Q^{27}$ or $Q^{28}$ is preferably from 1 to 10, more preferably from 1 to 6, particularly preferably from 1 to 4. However, the lower limit value of the number of carbon atoms in the alkylene group in the case of having a specific bond between carbon-carbon atoms is 2.

As the ring structure in $Z^1$, the above-mentioned ring structure may be mentioned, and the preferred form is also the same. Further, since $A^1$ and $Q^{24}$ are directly bonded to the ring structure in $Z^1$, there is no possibility that, for example, an alkylene group is linked to the ring structure and $A^1$ and $Q^{24}$ are linked to that alkylene group.

$Z^a$ is a (i5+1)-valent organopolysiloxane residue, preferably any one of the following groups. Here, $R^a$ in the following formulas is an alkyl group (preferably $C_{1-10}$) or a phenyl group.

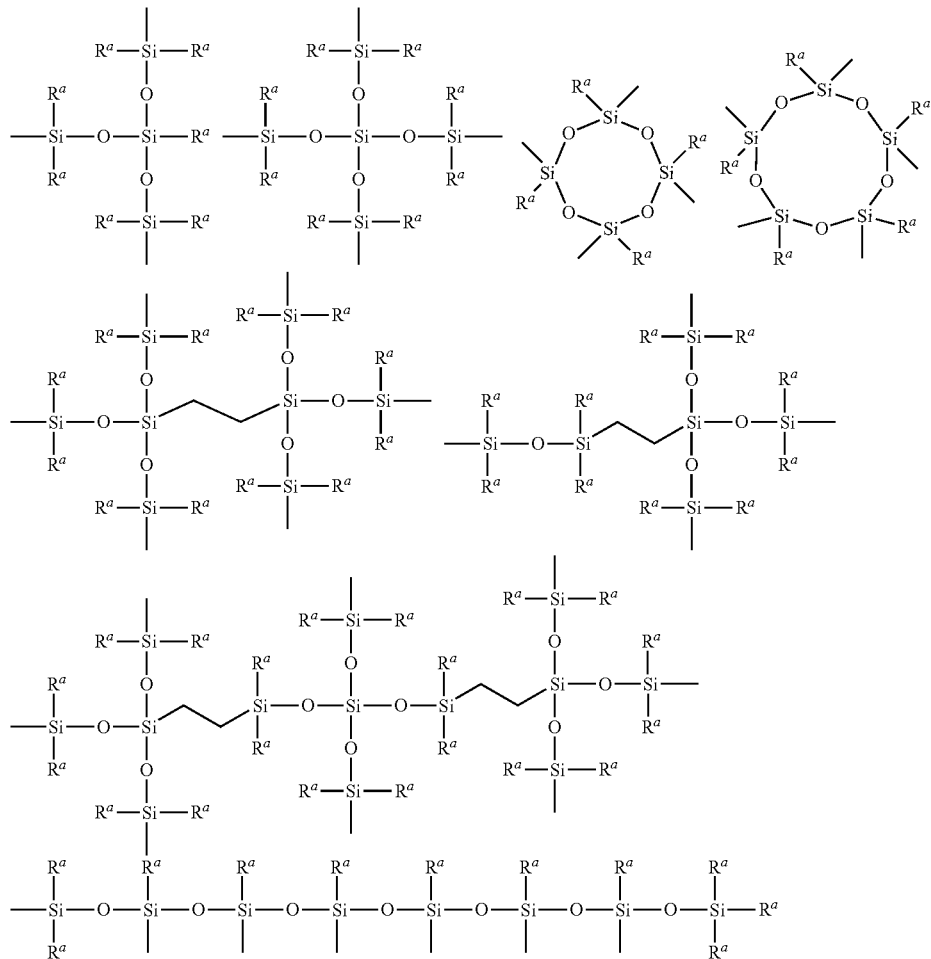

The number of carbon atoms in the alkyl group for $R^{e1}$, $R^{e2}$, $R^{e3}$ or $R^{e4}$ is preferably from 1 to 10, more preferably from 1 to 6, further preferably from 1 to 3, particularly preferably from 1 to 2.

The number of carbon atoms in the alkyl group moiety of the acyloxy group for $R^{e2}$ is preferably from 1 to 10, more preferably from 1 to 6, further preferably from 1 to 3, particularly preferably from 1 to 2.

h1 is preferably from 1 to 6, more preferably from 1 to 4, further preferably 1 or 2, particularly preferably 1.

h2 is preferably from 2 to 6, more preferably from 2 to 4, particularly preferably 2 or 3.

Other forms of Z in the formula (1) include the following group g3-1 (where d1+d3=1 (i.e. d1 or d3 is 0), n1=d2×r1+d4×r1), group g3-2 (where e1=1, n1=e2×r1), group g3-3 (where n1=2×r1), group g3-4 (where h1=1, n1=h2×r1), group g3-5 (where i1=1, n1=i2×r1), group g3-6 (where g1=r1), group g3-7 (where n1=r1×(i3+1)), group g3-8 (where n1=r1×i4) and group g3-9 (where n1=r1×i5).

Other forms of Z in the formula (2) include the group g3-1 (where n2=d2×r1+d4×r1, n3=d2×r1+d4×r1), group g3-2 (where n2=e2×r1, n3=e2×r1), group g3-3 (where n2=2×r1, n3=2×r1), group g3-4 (where n2=h2×r1, n3=h2×r1), group g3-5 (where n2=i2×r1, n3=i2×r1), group g3-6 (where n2=r1, n3=r1), group g3-7 (where n2=r1×(i3+1), n3=r1×(i3+1)), group g3-8 (where n2=r1×i4, n3=r1×i4) and group g3-9 (where n2=r1×i5, n3=r1×i5).

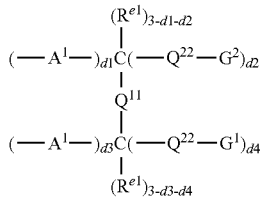

Formula (g3-1)

$(-A^1-)e1C(R^{e2})_{4-e1-e2}(-Q^{22}-G^1)e2$  Formula (g3-2)

$-A^1-N(-Q^{23}-G^1)_2$  Formula (g3-3)

$(-A^1-)h1Z^1(-Q^{24}-G^1)h2$  Formula (g3-4)

$(-A^1-)i1Si(R^{e3})_{4-i1-i2}(-Q^{25}-G^1)_{i2}$  Formula (g3-5)

$-A^1-Q^{26}-G^1$  Formula (g3-6)

$-A^1-CH(-Q^{22}-G^1)-Si(R^3)_{3-i3}(-Q^{25}-G^1)_{i3}$  Formula (g3-7)

$-A^1-[CH_2C(R^{e4})(-Q^{27}-G^1)]i4-R^{e5}$  Formula (g3-8)

$-A^1-Ze(Q^{28}-G)_{i5}$  Formula (g3-9)

Here, in the formulas (g3-1) to (g3-9), $A^1$ is connected to the $(OX)_m$ side and $G^1$ is connected to the A side.

G¹ is the group g3, and in each formula, in a case where two or more G¹ are present, the two or more G¹ may be the same or different. The symbols other than G¹ are the same as those in the formulas (g2-1) to (g2-9).

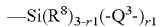   Formula (g3)

Here, in the formula (g3), Si is connected to the $Q^{22}$, $Q^{23}$, $Q^{24}$, $Q^{25}$, $Q^{2}$, $Q^{27}$ and $Q^{28}$ side, and $Q^3$ is connected to the A side. $R^B$ is an alkyl group. $Q^3$ is an alkylene group, or a group having —C(O)NR$^B$—, —C(O)—, —NR$^B$— or —O— between carbon-carbon atoms in an alkylene group having two or more carbon atoms, and the two or more $Q^3$ may be the same or different. r1 is 2 or 3. $R^6$ is a hydrogen atom, a $C_{1-6}$ alkyl group or a phenyl group.

The number of carbon atoms in the alkylene group for $Q^3$ is preferably from 1 to 10, more preferably from 1 to 6, particularly preferably from 1 to 4. However, the lower limit value of the number of carbon atoms in the alkylene group in the case of having a specific bond between carbon-carbon atoms is 2.

The number of carbon atoms in the alkyl group for $R^8$ is preferably from 1 to 10, more preferably from 1 to 6, further preferably from 1 to 3, particularly preferably from 1 to 2.

The number of carbon atoms in the alkyl group for $R^9$ is preferably from 1 to 10, more preferably from 1 to 6, further preferably from 1 to 3, particularly preferably from 1 to 2.

The number of carbon atoms in the alkoxy group for $R^9$ is preferably from 1 to 10, more preferably from 1 to 6, further preferably from 1 to 3, particularly preferably from 1 to 2.

p is preferably 0 or 1.

R is any one of the functional groups selected from —OH, —CR¹=CR²R³, —CHs, —NH₂, —SH, -Ph (phenyl group), —F, —Cl, —Br, —I, —C≡CH and —N₃.

R¹ is a hydrogen atom, a fluorine atom, a methyl group or a trifluoromethyl group, and R² and R³ are each independently a hydrogen atom or a fluorine atom.

Specific examples of the group represented by —CR¹=CR²R³ include —CH=CH₂, —C(CH₃)=CH₂, —C(CF₃)=CH₂, —CF=CH₂, —CH=CHF, —CF=CHF, —CH=CF₂ and —CF=CF₂.

As R, —OH or —NH₂ is preferred, since it is possible to separate compound (1) and compound (2) to a higher purity.

n1 indicating the number of functional groups R at one terminal of compound (1), n2 indicating the number of functional groups R at one terminal of compound (2) and n3 indicating the number of functional groups R at the other terminal, respectively represent integers of from 1 to 10, and it is preferred that they all represent the same integers.

N1, n2 and n3 are preferably 1.

Z in the formulas (1) and (2) is preferably an alkylene group having —O—, —C(O)O— or —C(O)—, or group g2-2. A hydrogen atom in the alkylene group may be replaced by a fluorine atom or a hydroxy group. The number of carbon atoms in the above alkylene group is preferably from 1 to 10, more preferably from 1 to 6.

Further, as a specific example of the alkylene group which may have —O—, —C(O)O— or —C(O)—, -alkylene group-C(O)O— or -alkylene group-C(O)— may be mentioned.

Preferred specific examples of —O—Z—(R)$_{n1}$, —O—Z—(R)$_{n2}$ and —O—Z—(R)$_{n3}$ in the formulas (1) and (2) include —O—(CF₂)$_{n4}$—CH₂OH, —O—(CF₂)$_{n4}$—C(OH)(CH₂CH=CH₂)₂, —O—(CF₂)$_{n4}$—COOCH₃, —O—(CF₂)$_{n4}$—CH₂OC(=O)C(CH₂CH=CH₂)₃, —O—(CF₂)$_{n4}$—CONHC(=O)H₂C(CH₂CH=CH₂)₃, —O—(CF₂)$_{n4}$—CONH₂ and —O—(CF₂)$_{n4}$—CH₂NHCOC(CH₂CH=CH₂)₃. n4 is an integer of 1 or more, preferably from 1 to 6, particularly preferably from 1 to 3.

(Separation Method by Chromatography)

Chromatography in the separation method of the present invention is not particularly limited and a known method can be used as long as a stationary phase and a mobile phase are used, and, for example, column chromatography and thin layer chromatography may be mentioned. Preferably column chromatography, particularly preferably flash column chromatography or high performance liquid chromatography (HPLC) is used.

(Stationary Phase)

The stationary phase is preferably selected from the group consisting of aluminum oxide, silica gel, magnesium oxide, aluminum silicate, magnesium silicate, chemically modified silica gel and diatomaceous earth.

As the stationary phase, silica gel is more preferred. Specific examples of silica gel include unmodified silica gel, amino group-containing silica gel, and cyano group-containing silica gel.

As silica gel, a commercially available product may be used. Examples of commercially available silica gel are Chromatrex PSQ-100B (product name of Fuji Silysia Chemical Ltd.), Wakogel C-200 (product name of Wako Pure Chemical Industries, Ltd.), 115111 silica gel 60 (product name of Merck).

The amount of the stationary phase to be used is suitably selected according to the compounds to be separated, the mobile phase to be used, and the type of chromatography. Preferably, an amount equal to or greater than the mixture to be separated by mass is used. Further, in a case where the molecular weight of the compound to be separated is relatively small, it is preferred to use a larger amount of the stationary phase.

(Mobile Phase)

The mobile phase contains the specific solvent as described below.

The specific solvent includes an (acyclic) hydrofluoroolefin (hereafter referred to also as HFO), an (acyclic) hydrochlorofluoroolefin (hereafter referred to also as HCFO), an (acyclic) chlorofluoroolefin (hereinafter referred to also as CFO), a cyclic hydrofluoroolefin (hereafter referred to also as cyclic HFO), a cyclic hydrochlorofluoroolefin (hereinafter referred to also as cyclic HCFO), a cyclic chlorofluoroolefin (hereinafter referred to also as cyclic CFO), a cyclic hydrofluorocarbon (hereinafter referred to also as cyclic HFC), a cyclic hydrochlorofluorocarbon (hereinafter referred to also as cyclic HCFC), a cyclic chlorofluorocarbon (hereinafter referred to also as CFC) and a perfluoroketone (hereinafter referred to also as PFK). Among these, one type may be used, or two or more types may be used in combination.

HFO includes, for example, CF₃CH₂CF=CH₂, CF₃CH=CHCF₃ (E) and CF₃CH=CHCF₃ (Z).

HCFO includes, for example, CF₃CF=CCl₂, CFCl₂CF=CF₂, CHF₂CF=CHCl, CF₃CH=CHCl (Z), CF₃CH=CHCl (E), CClF₂CF=CHCl and CHF₂CF₂CF₂CF=CHCl.

CFO includes, for example, CF₃CF=CCl₂ and CFCl₂CF=CF₂.

As cyclic CFO, those represented by the following formulas may be mentioned.

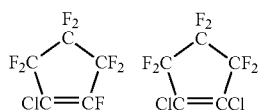

As HFC, for example, one represented by the following formula may be mentioned.

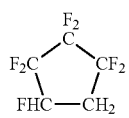

As PFK, for example, $CF_3CF_2COCF(CF_3)_2$, $(CF_3)_2CFCOCF(CF_3)_2$ and $CF_3CF_2CF_2OCFCF_3COCF(CF_3)_2$ may be mentioned.

As the specific solvent, one which does not contain a chlorine atom is preferred since it does not adversely affect the global environment. Specifically, HFO, cyclic HFO, cyclic HFC or PFK is preferred.

Further, as the specific solvent, HFO, HCFO, CFO, cyclic HFO, cyclic HCFO, cyclic CFO, cyclic HFC, cyclic HCFC or cyclic CFC is preferred, since it can separate compound (1) and compound (2) with higher purity; HFO, CFO, cyclic HFO, cyclic CFO, cyclic HFC or cyclic CFC is more preferred, and HFO, cyclic HFO or cyclic HFC is particularly preferred.

The mobile phase may contain other solvents in addition to the specific solvent As other solvents, a hydrocarbon, an ether, a ketone, an ester, a chlorinated hydrocarbon, a fluorinated ether, etc. may be mentioned.

As the hydrocarbon, pentane, hexane, heptane, octane, cyclohexane, benzene, toluene, xylene or the like may be mentioned.

As the ether, diethyl ether, tetrahydrofuran or the like may be mentioned.

As the ketone, acetone, 2-butanone or the like may be mentioned.

As the ester, ethyl acetate or the like may be mentioned.

As the chlorinated hydrocarbon, methylene chloride or the like may be mentioned.

As the fluorinated ether, $CF_3CH_2OCF_2CF_2H$, ethyl nonafluorobutyl ether, ethyl nonafluoroisobutyl ether, 1,1,1,2,2,3,4,5,5,5-decafluoro-3-methoxy-4-trifluoromethyl-pentane or the like may be mentioned.

The above other solvents may be mixed with the specific solvent and used as a single phase, or the specific solvent may be combined with other solvents and used as a gradient elution method.

The separation method of the present invention has a step of adsorbing the mixture to the stationary phase. The method of adsorbing the mixture to the stationary phase is not particularly limited and may be a method normally performed in chromatography.

In a case where column chromatography is used as chromatography, the mixture is supplied directly or as mixed with a solvent onto the stationary phase packed in a column, and the mixture is adsorbed to the stationary phase. In this case, the solvent to be used is preferably a specific solvent to be used as the mobile phase.

Next, a step of letting the mobile phase containing the specific solvent pass through the stationary phase to which the mixture has been adsorbed, is carried out. In a case where column chromatography is used as chromatography, a solvent as the mobile phase is injected from the top of the column, and let the mobile phase containing the specific solvent pass through the stationary phase to which the mixture is adsorbed.

When the mobile phase containing the specific solvent is passed through, compound (1) of monofunctional species in the mixture adsorbed on the stationary phase elutes first. Therefore, compound (1) in the mixture can be separated. In a case where column chromatography is used as chromatography, highly pure compound (1) can be obtained by collecting the fraction obtained from the bottom of the column.

Next, when the mobile phase containing the specific solvent is further passed through, compound (2) of bifunctional species in the mixture adsorbed on the stationary phase elutes. Therefore, compound (2) in the mixture can be separated. If the fraction obtained from the bottom of the column is collected, highly pure compound (2) can be obtained.

Here, in order to elute compound (2), the type of the specific solvent to be used in the mobile phase may be changed.

In the separation method of the present invention, the temperature of the stationary phase at the time of separating compounds is preferably from −10° C. to 100° C., more preferably from 5° C. to 50° C., further preferably from 10° C. to 40° C. The temperature of the stationary phase is often room temperature (25° C.).

In the separation method of the present invention, the mixture containing compound (1) and compound (2) may further contain the following compound (3) of 0-functional species.

$$A\text{-}(OX)_m\text{—}O\text{-}A \qquad \text{Formula (3)}$$

Here, A, X, and m are the same as in the formulas (1) and (2).

In a case where the mixture contains compound (3), the ratio of compound (1), compound (2) and compound (3) in the mixture is not particularly limited, but, for example, the ratio (on a mass basis) of compound (1)/compound (2)/compound (3) is 1 to 95/1 to 95/1 to 95.

In a case where the mixture further contains compound (3), compound (3) of 0-functional species elutes before compound (1) of monofunctional species elutes out of the mixture adsorbed on the stationary phase. Thus, compound (3) in the mixture can be separated.

In a case where column chromatography is used as the chromatography in this separation method, it is preferred to pressurize the inside of the column by e.g. an inert gas such as nitrogen or argon. The pressure (gauge pressure) at the time of pressurization is preferably from 0.1 MPa to 1.0 MPa, particularly preferably from 0.1 MPa to 0.5 MPa.

EXAMPLES

In the following, the present invention will be described in detail with reference to Examples. Ex. 1 to Ex. 32 are Examples of the present invention, and Ex. 33 to Ex. 37 are Comparative Examples. However, the present invention is not limited to these Examples. The content (%) of each component in Table 1 given below indicates the mass standard.

Further, the structures of the fluorinated compounds used in Examples are as shown below.

$(CF_2CF_2O\text{—}CF_2CF_2CF_2CF_2O)_x$ type
   0-functional species: $CF_3\text{—}O\text{—}(CF_2CF_2O\text{—}CF_2CF_2CF_2CF_2O)_x]\text{-}CF_3$ Monofunctional species: $CF_3$—O—$(CF_2CF_2O$—$CF_2CF_2CF_2CF_2O)_{x2}$—$CF_2CF_2OCF_2CF_2CF_2$—X Bifunctional species: X—$CF_2CF_2CF_2OCF_2CF_2$—$(CF_2CF_2OCF_2CF_2CF_2CF_2O)_{x3}$—$CF_2CF_2OCF_2CF_2CF_2$—X X is the terminal functional group, the mass average molecular weight of the structure other than X is 4,800, and the repeating units: x1, x2=14.5.

$(CF_2O)_n \cdot (CF_2CF_2O)_m$ type 0-functional species: $CF_3$—O—$(CF_2O)_n \cdot (CF_2CF_2O)_m$—$CF_3$ Monofunctional species: $CF_3$—O—$(CF_2O)_n \cdot (CF_2CF_2O)_m$—X Bifunctional species: X—$(CF_2O)_n \cdot (CF_2CF_2O)_m$—X X is the terminal functional group, and the mass average molecular weight of the structure other than X is 4,500, and the repeating units: n=25, and m=22.

Synthesis of Fluorinated Compounds

Synthesis Example 1

Synthesis Example 1-1

The following compound (A-1) was obtained by the method described in Example 7 of WO2013/121984.

$CF_3O$—$(CF_2CFHO$—$CF_2CF_2CF_2CH_2O)_{a1}$-H: A-1

Repeating unit a1=14.5

Synthesis Example 1-2

In a 200-mL three-necked flask, 30 g of compound (A-1), 1 g of a 48% KOH solution, 1.1 g of water and 0.55 g of tert-butyl alcohol were mixed at 80° C. for 10 minutes. To the obtained mixed liquid, 2.4 g of perfluoropropyl vinyl ether was dropwise added and mixed at 80° C. for 4 hours. After cooling the mixed liquid to room temperature, 60 g of AC-2000 ($C_6F_{13}H$: manufactured by AGC Inc.) was added, and further, in an ice bath, 6.5 g of 2N hydrochloric acid was dropwise added. The mixed liquid was transferred to a 200-mL separating funnel and allowed to stand for 1 hour. The lower phase was withdrawn and put into a new 200-mL separating funnel, and 87 g of water was added, followed by stirring. After being left to stand for 1 hour, the lower phase was recovered and concentrated to obtain the following compound (A-2).

$CF_3O$—$(CF_2CFHO$—$CF_2CF_2CF_2CH_2O)_{a2}$-$CF_2CF_2CF_3$: A-2

Repeating unit a2=14.5

Synthesis Example 1-3

An autoclave (made of nickel, internal volume 500 mL) was prepared, and at the gas outlet of the autoclave, a cooler maintained at 0° C., a NaF pellet filled layer and a cooler maintained at −10° C. were installed in series. Further, a liquid returning line to return a liquid flocculated from the cooler maintained at −10° C. back to the autoclave was installed.

In the above autoclave, 312 g of R-113 ($CF_2ClCFCl_2$) was put, followed by stirring while maintaining the temperature at 25° C. After blowing nitrogen gas into the autoclave at 25° C. for 1 hour, 20% fluorine gas was blown into the autoclave at 25° C. at a flow rate of 2.0 L/hour for 1 hour. Next, while blowing 20% fluorine gas at the same flow rate, a solution having 8.4 g of compound (A-2) dissolved in 84 g of R-113, was injected to the autoclave over 3.6 hours.

Then, while blowing 20% fluorine gas at the same flow rate, the internal pressure of the autoclave was pressurized to 0.15 MPa (gauge pressure). Into the autoclave, 9 mL of a benzene solution containing 0.015 g/mL of benzene in R-113 was injected while heating from 25° C. to 40° C., and the benzene solution inlet of the autoclave was closed. After stirring for 15 minutes, 6 mL of the benzene solution was injected again while maintaining the temperature at 40° C., and the inlet was closed. The same operation was repeated three more times. The total amount of benzene injected was 0.33 g.

Further, while 20% fluorine gas was blown into the autoclave at the same flow rate, stirring was continued for 1 hour. Then, the pressure in the autoclave was brought to atmospheric pressure, and nitrogen gas was blown into the autoclave for 1 hour. The content of the autoclave was concentrated by an evaporator to obtain 8.8 g of the following compound (A-3) of 0-functional species.

$CF_3O$—$(CF_2CF_2O$—$CF_2CF_2CF_2CF_2O)_{a3}$—$CF_2CF_2O$—$CF_2CF_2CF_2$—$CF_2$—O-$CF_2CF_2CF_3$: A-3

Repeating unit a3=14.5

Synthesis Example 1-4

The following compound (B-1) of monofunctional species was obtained by the method described in Example 7 of WO2013/121984.

$CF_3O$—$(CF_2CF_2O$—$CF_2CF_2CF_2CF_2O)_{b1}$—$CF_2CF_2O$—$CF_2CF_2CF_2$—$CH_2OH$: (B-1)

Repeating unit b1=14.5

Synthesis Example 1-5

In a 200-mL egg plant flask, 16.2 g of $HOCH_2CF_2CF_2CH_2OH$ and 13.8 g of potassium carbonate were put, followed by stirring at 120° C., and 278 g of the compound (A-1) obtained in Synthesis Example 1-1 was added, followed by stirring at 120° C. for 2 hours. The temperature in the egg plat flask was set to 25° C., and 50 g each of AC-2000 and hydrochloric acid were added, followed by liquid separation, and the organic phase was concentrated. The obtained reaction crude liquid was purified by silica gel column chromatography to obtain 117.7 g of the following compound (C-1).

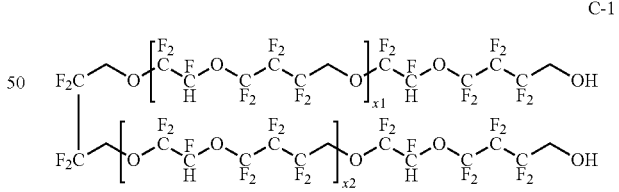

C-1

Repeating unit x1+x2=13.5

Synthesis Example 1-6

In a 50-mL egg plant flask, 20 g of compound (C-1), 7.1 g of a powder of sodium fluoride, 20 g of AC-2000 and 20 g of $CF_3CF_2CF_2OCF(CF_3)COF$ were added. Then, under a nitrogen atmosphere, the mixed liquid was stirred at 50° C. for 24 hours. After the temperature in the egg plant flask was brought to 25° C., the sodium fluoride powder was removed by filtration. Excess $CF_3CF_2CF_2OCF(CF_3)COF$ and AC-2000 were distilled off under reduced pressure to obtain 24 g of the following compound (C-2).

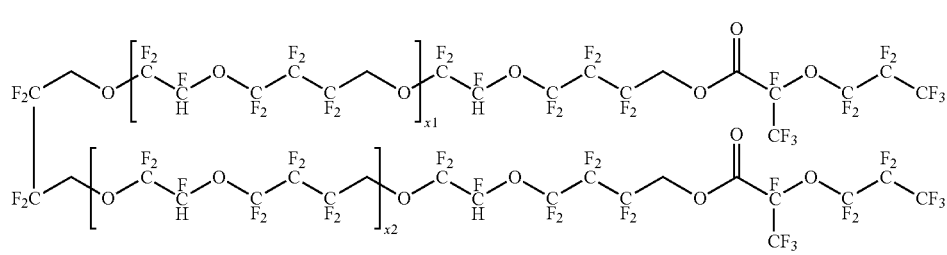
C-2

Repeating unit x1+x2=13.5

Synthesis Example 1-7

In a 500-mL metal reactor, 250 mL of $ClCF_2CFClCF_2OCF_2CF_2Cl$ (hereinafter referred to as "CFE-419") was put and bubbled with nitrogen gas, then 20 vol % fluorine gas diluted with nitrogen gas was bubbled. A CFE-419 solution of the above compound (C-2) (concentration: 10%, compound (C-2): 24 g) was introduced over a period of 6 hours. The ratio of the introduction rate of fluorine gas (mol/hour) to the introduction rate of hydrogen atoms in compound (C-2) (mol/hour) was controlled to become 2:1. After the introduction of the compound (C-2) was finished, a CFE-419 solution of benzene (concentration: 0.1%, benzene: 0.1 g) was introduced intermittently. After the introduction of benzene was finished, fluorine gas was bubbled, and finally the inside of the reactor was fully replaced with nitrogen gas. The solvent was distilled off to obtain 25.3 g of the following compound (C-3).

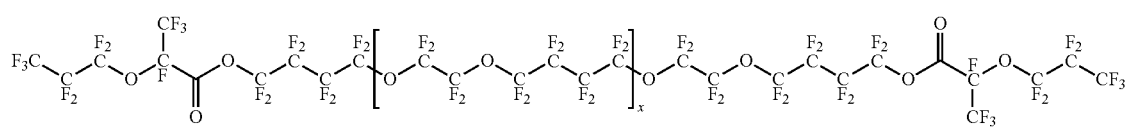
C-3

Repeating unit x=14.5

Synthesis Example 1-8

In a 50-mL egg plant flask, 25.3 g of compound (C-3), 2.2 g of sodium fluoride and 25 mL of AC-2000 were put, and in an ice bath, the mixed liquid was stirred. To the obtained mixed liquid, 1.7 g of methanol was put, followed by stirring at 25° C. for 1 hour. The mixed liquid was filtered, and the filtrate was purified by silica gel column chromatography. 15 g of the following compound (C-4) was obtained.

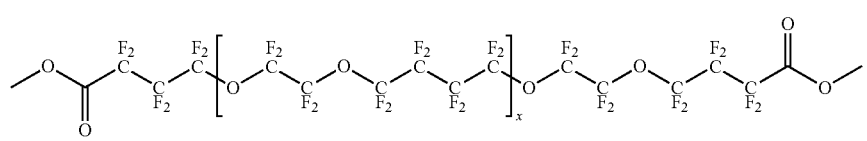
C-4

Repeating unit x=14.5

Synthesis Example 1-9

In a 50-mL two-necked egg plant flask, 0.04 g of lithium aluminum hydride was suspended in 1.6 g of THF (tetrahydrofuran). While the mixed liquid was cooled in an ice bath, a solution having 6.1 g of the above compound (C-4) diluted by 6.0 g of AC -6000 ($C_6F_{13}C_2H_5$: manufactured by AGC Inc.), was slowly dropwise added. Thereafter, the ice bath was removed, and stirring was continued while the temperature was slowly raised to room temperature. After stirring at room temperature for 12 hours, an aqueous hydrochloric acid solution was dropwise added until the liquid became acidic. 15 mL of AK-225 was added, followed by washing once with water and once with saturated brine, to recover the organic phase. The recovered organic phase was concentrated by an evaporator to obtain 5.9 g of the following compound (C-5) of bifunctional species.

HO—$CH_2$—$CF_2CF_2CF_2O$—($CF_2CF_2O$—$CF_2CF_2CF_2CF_2O)_{c5}$—$CF_2CF_2O$—$CF_2CF_2CF_2$—$CH_2$OH: C-5

Repeating unit x=14.5

Synthesis Example 1-10

5 g of compound (A-3) of 0-functional species, 86 g of compound (B-1) of monofunctional species, and 9 g of compound (C-5) of bifunctional species were mixed to make the sample mixtures for Ex. 1 to 16 and 35 to 37.

Synthesis Example 2

Synthesis Example 2-1

Fomblin M (product name of Solvay Solexis, Inc.) was purified by silica gel column chromatography to obtain the following compound (D-1) of 0-functional species.

$CF_3$—O—$(CF_2O)_n$·$(CF_2CF_2O)_m$—$CF_3$: D-1

Repeating unit n=25, m=22

Synthesis Example 2-2

The following compound (E-1) was obtained in accordance with the method described in Ex. 1 of Examples (specifically Ex. 1-1 to Ex. 1-4) of WO2017/038830.

$CF_3CF_2CF_2OCF_2CF_2OCF_2CF_2[(OCF_2)_n$·$(OCF_2CF_2)_m]OCF_2C(=O)OCH_3$: E-1

Repeating unit n=25, m=21

Next, into a 300 cc three-necked round bottom flask, 2.4 g of sodium borohydride powder was put, and 15 g of AC-2000 (product name of AGC Inc.) was added. While cooling in an ice bath, the mixture was stirred, and under a nitrogen atmosphere, a solution having 30 g of the above compound (E-1), 4 g of methanol and 60 g of AC-2000 mixed, was slowly dropwise added from a dropping funnel so that the internal temperature did not exceed 10° C. After the total volume was dropped, another 4 g of methanol was dropwise added. Thereafter, the mixture was stirred at 10° C. for 1 hour. It was cooled again in an ice bath, and an aqueous hydrochloric acid solution was dropwise added until the liquid became acidic. After the reaction was completed, it was washed once with hydrochloric acid solution and once with water, and the organic phase was recovered.

The recovered organic phase was concentrated by an evaporator. The recovered concentrated liquid was distilled off under reduced pressure and column purification was carried out to obtain 24 g of the following compound (E-2).

$CF_3CF_2CF_2OCF_2CF_2OCF_2CF_2[(OCF_2)_n \cdot (OCF_2CF_2)_m]$
$OCF_2$—$CH_2$—OH: E-2

Repeating unit n=25, m=21

Synthesis Example 2-3

The following compound (F-1) of bifunctional species was obtained by purifying Fomblin D4000 (product name of Solvay Solexis, Inc.) by silica gel column chromatography.

$HOCH_2$—$(CF_2O)\{(CF_2O)_n \cdot (CF_2CF_2O)_m\}$—$CF_2$—$CH_2OH$: F-1

Repeating unit n=25, m=22

Synthesis Example 2-4

15 g of compound (D-1) of 0-functional species, 55 g of compound (E-2) of monofunctional species and 30 g of compound (F-1) of bifunctional species were mixed to make the mixtures of Ex. 17 to Ex. 25.

obtained mixed liquid was reacted at an internal temperature of 60° C. for 6 hours and cooled to room temperature (20° C.). After that, the mixed liquid was added to a separating funnel covered with hydrochloric acid water (hydrochloric acid water having 6 g of 12N hydrochloric acid and 54 g of water mixed), followed by stirring for 30 minutes, and then the lower layer was recovered. The recovered liquid was subjected to evaporation under a condition of 110° C./1 mmHg to remove the solvent component, followed by purification by silica gel column chromatography to obtain 35 g of the following compound (G-2) of monofunctional species.

$CF_3O$—$(CF_2CF_2O$—$CF_2CF_2CF_2CF_2O)_{g2}CF_2CF_2OCF_2CF_2CF_2C(OH)(CH_2CH=CH_2)_2$: G-2

Repeating unit g2=14.5

Synthesis Example 3-3

In a 300-mL four-necked flask equipped with a Dimroth condenser, a dropping funnel, a thermometer and a magnetic stirrer, 40 g of compound (C-4), 50 g of a diethyl ether solution of allylmagnesium bromide (bromo group concentration: 0.05 mol/100 g), 40 g of 1,3-bisfluoromethylbenzene and 13 g of tetrahydrofuran, were charged, and the inside of the flask was replaced with nitrogen. While stirring, the obtained mixed liquid was reacted at an internal temperature of 60° C. for 6 hours and cooled to room temperature (20° C.). After that, the mixed liquid was added slowly to a separating funnel filled with hydrochloric acid water (hydrochloric acid water having 6 g of 12N hydrochloric acid and 54 g of water mixed), stirred for 30 minutes, and the lower layer was recovered. The recovered liquid was subjected to evaporation under a condition of 110° C./1 mmHg to remove the solvent component, followed by purification by silica gel column chromatography to obtain 35 g of the following compound (H-1) of bifunctional species.

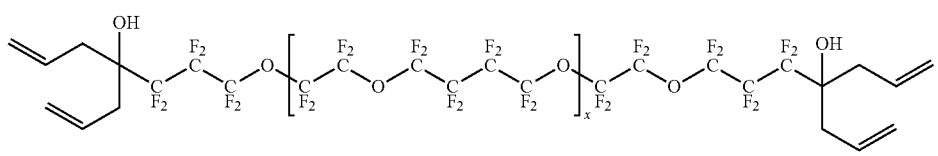

H-1

Repeating unit x=14.5

Synthesis Example 2-5

5 g of compound (D-1) of 0-functional species, 86 g of compound (E-2) of monofunctional species and 9 g of compound (F-1) of bifunctional species were mixed to make the mixture in Ex. 32.

Synthesis Example 3

Synthesis Example 3-1

The following compound (G-1) was obtained by the method described in Example 6 of WO2013/121984.

$CF_3$—O—$(CF_2CF_2O$—$CF_2CF_2CF_2CF_2O)_{g1}$—$CF_2CF_2OCF_2CF_2CF_2C(=O)OCH_3$: G-1

Repeating unit g1=14.5

Synthesis Example 3-2

In a 300-mL four-necked flask equipped with a Dimroth condenser, a dropping funnel, a thermometer and a magnetic stirrer, 40 g of compound (G-1), 25 g of a diethyl ether solution of allylmagnesium bromide (bromo group concentration: 0.05 mol/100 g), 40 g of 1,3-bisfluoromethylbenzene and 13 g of tetrahydrofuran were charged, and the inside of the flask was replaced with nitrogen. While stirring, the Synthesis Example 3-4

5 g of the above compound (A-3) of 0-functional species, 86 g of the above compound (G-2) of monofunctional species and 9 g of the above compound (H-1) of bifunctional species were mixed to make the sample mixed liquid of Ex. 26.

Synthesis Example 4

Synthesis Example 4-1

5 g of the above compound (A-3) of 0-functional species, 86 g of the above compound (G-1) of monofunctional species and 9 g of the above compound (C-4) of bifunctional species were mixed to make the sample mixture of Ex. 27.

Synthesis Example 5

Synthesis Example 5-1

In a 200 cc egg plant flask, 0.67 g of $HO(C=O)C(CH_2CH=CH_2)_3$, 33 mL of dichloromethane and 0.67 mL of oxalyl chloride were added, followed by stirring under cooling with ice, and then, 0.0393 g of DMF (N,N-dimethylformamide) was added. Then, the mixed liquid was stirred at room temperature and concentrated to obtain 0.6 g of $Cl(C=O)C(CH_2CH=CH_2)_3$.

Separately, in a 50 cc egg plant flask, 7 g of compound B-1, 7 g of AC-6000, 0.4 g of triethylamine and 0.2 g of N,N-dimethyl-4-aminopyrdine were added, and further, 0.6 g of the above $Cl(C=O)C(CH_2CH=CH_2)_3$ was added, and the mixed liquid was stirred at 30° C. The obtained mixed liquid was purified by silica gel column chromatography to obtain 5.8 g of the following compound (1-1) of monofunctional species.

$CF_3O(CF_2CF_2OCF_2CF_2CF_2CF_2O)_{i1}CF_2CF_2OCF_2CF_2CF_2$—$CH_2O(C=O)C(CH_2CH=CH2)_3$: I-1

Repeating unit i1=14.5

Synthesis Example 5-2

In a 200 cc egg plant flask, 0.67 g of $HO(C=O)C(CH_2CH=CH_2)_3$, 33 mL of dichloromethane and 0.67 mL of oxalyl chloride were added, followed by stirring under cooling with ice, and then, 0.0393 g of DMF (N,N-dimethylformamide) was added. Then, the mixed liquid was stirred at room temperature and concentrated to obtain 0.6 g of $Cl(C=O)C(CH_2CH=CH_2)_3$.

Synthesis Example 5-3

Separately, in a 50 cc egg plant flask, 3.5 g of compound C-5, 7 g of AC-6000, 0.4 g of triethylamine and 0.2 g of N,N-dimethyl-4-aminopyddine were added, and 0.6 g of the above $Cl(C=O)C(CH_2CH=CH_2)_3$ was added, and the mixed liquid was stirred at 30° C. The obtained mixed liquid was purified by silica gel column chromatography to obtain 2.4 g of the following compound (J-1) of bifunctional species.

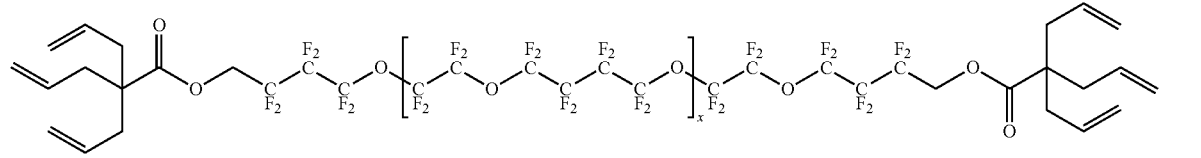

Repeating unit x=14.5

Synthesis Example 5-4

5 g of compound (A-3) of 0-functional species, 86 g of compound (1-1) of monofunctional species and 9 g of compound (J-1) of bifunctional species were mixed to make the sample mixture of Ex. 28.

Synthesis Example 6

Synthesis Example 6-1

The following compound (K-1) of monofunctional species was obtained by the method described in Example 11 of WO2017/038830.

$CF_3$—O—$(CF_2CF_2O$—$CF_2CF_2CF_2CF_2O)_{k1}$ $(CF_2CF_2O)$—$CF_2CF_2CF_2$—$C(O)NH$—$CH_2$—$C(CH_2CH=CH_2)_3$: K-1

Repeating unit k1=14.5

Synthesis Example 6-2

In a 50-mL egg plant flask, 15 g of compound (C-4), 3.2 g of $H_2NCH_2C(CH_2CH=CH_2)_3$ and 15 mL of AC-2000 were put, and the mixed liquid was stirred at 0° C. for 24 hours. The mixed liquid was purified by silica gel column chromatography. 11.2 g of the following compound (L-1) of bifunctional species was obtained.

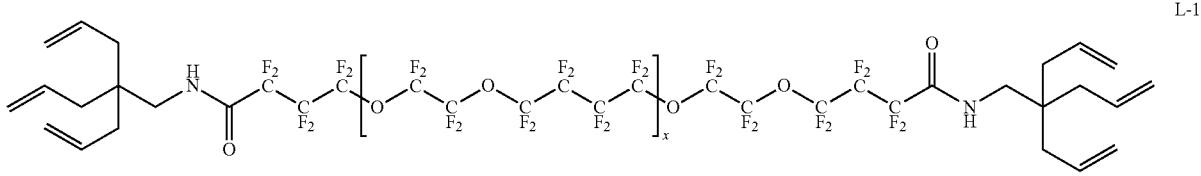

Repeating unit x=14.5

Synthesis Example 6-3

5 g of compound (A-3) of 0-functional species, 86 g of compound (K-1) of monofunctional species and 9 g of compound (L-1) of bifunctional species were mixed to make the sample mixture of Ex. 29.

Synthesis Example 7

Synthesis Example 7-1

In a 100 cc pressure-resistant reactor, 15 g of compound G-1, 50 g of ASAHIKLIN AK-225 (product name of AGC Inc.) and 7.5 g of a 2.0 M ammonia-methanol solution were put, and the mixed liquid was stirred at room temperature for 6 hours. Thereafter, the solvent was removed from the mixed liquid to obtain 14.8 g of the desired compound (M-1) of monofunctional species.

$CF_3(OCF_2CF_2OCF_2CF_2CF_2CF_2)_{m1}OCF_2CF_2$ $OCF_2CF_2CF_2$—$C(=O)NH_2$: M-1 Repeating unit m1=14.5

Synthesis Example 7-2

In a 100 cc pressure-resistant reactor, 15 g of compound C-4, 50 g of ASAHIKLIN AK-225 (product name of AGC Inc.) and 15 g of a 2.0 M ammonia-methanol solution were put, and the mixed liquid was stirred at room temperature for 6 hours. Thereafter, the solvent was removed from the mixed liquid to obtain 14.8 g of the desired compound (N-1) of bifunctional species.

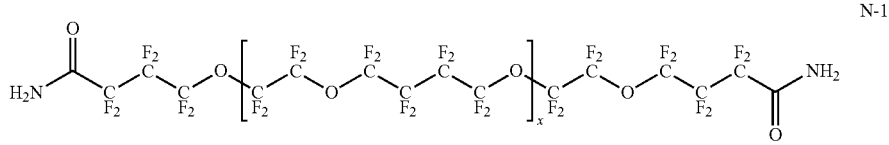

Repeating unit x=14.5

Synthesis Example 7-3

5 g of the above compound (A-3) of 0-functional species, 86 g of the above compound (M-1) of monofunctional species and 9 g of the above compound (N-1) of bifunctional species were mixed to make the sample mixture of Ex. 30.

Synthesis Example 8

Synthesis Example 8-1

In a 300 cc egg plant flask, 1.5 g of compound M-1, 75 g of AK-225 and 30 g of diethyl ether were added, followed by stirring under an ice bath. Thereafter, 0.31 g of lithium aluminum hydride was slowly added to the obtained mixed liquid, followed by stirring at room temperature for 20 hours. Thereafter, 0.3 cc of a saturated aqueous sodium sulfate solution was added to the mixed liquid, and the precipitated solid was removed by celite filtration. The obtained filtrate was concentrated and then purified by silica gel column chromatography to obtain 6.8 g of the desired compound (O-1).

$CF_3(OCF_2CF_2OCF_2CF_2CF_2CF_2)_{o1}OCF_2CF_2OCF_2CF_2CF_2—CH_2NH_2$: O-1

Repeating unit o1=14.5

Synthesis Example 8-2

Separately, in a 50 cc egg plant flask, 3.0 g of compound (A-3) and 0.35 mL of triethylamine were added, and 0.45 g of $Cl(C═O)C(CH_2CH═CH_2)_3$ synthesized in Synthesis Example 5-1 and 2 mL of 1,3-bisfluoromethylbenzene were added. The mixed liquid was stirred for 1 hour, and the solvent was distilled off. The obtained crude product was purified by silica gel column chromatography to obtain 1.7 g of the desired compound (O-2) of monofunctional species.

$CF_3(OCF_2CF_2OCF_2CF_2CF_2CF_2)_{o20}CF_2CF_2OCF_2CF_2CF_2—CH_2NH(C═O)C(CH_2CH═CH_2)_3$: O-2

Repeating unit o2=14.5

Synthesis Example 8-3

In a 300 cc egg plant flask, 15 g of compound (N-1), 75 g of AK-225 and 30 g of diethyl ether were added, followed by stirring under an ice bath. Thereafter, 0.62 g of lithium aluminum hydride was slowly added to the mixed liquid, followed by stirring at room temperature for 20 hours. Thereafter, 0.6 cc of a saturated aqueous sodium sulfate solution was added to the mixed liquid, and the precipitated solid was removed by celite filtration. The obtained filtrate was concentrated and then purified by silica gel column chromatography to obtain 6.8 g of the desired compound (P-1).

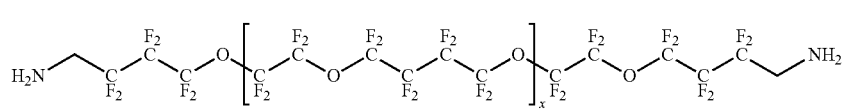
P-1

Repeating unit x=14.5

Synthesis Example 8-4

Separately, in a 50 cc egg plant flask, 3.0 g of compound (P-1) and 0.7 mL of triethylamine were added, and 0.45 g of Cl(C=O)C(CH$_2$CH=CH$_2$)$_3$ synthesized in Synthesis Example 5-3 and 2 mL of 1,3-bistrifluoromethylbenzene were added. The mixture was stirred for 1 hour, and the solvent was distilled off. The obtained crude product was purified by silica gel column chromatography to obtain 1.7 g of the following compound (P-2) of bifunctional species.

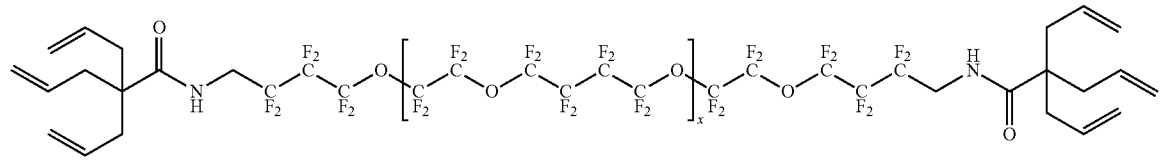
P-2

Repeating unit x=14.5

Synthesis Example 8-5

5 g of compound (A-3) of 0-functional species, 86 g of compound (O-2) of monofunctional species and 9 g of compound (P-2) of bifunctional species were mixed to make the sample mixture of Ex. 31.

Synthesis Example 9-1

In a 300-mL egg plant flask, 100 g of compound (F-1), 14.9 g of cesium carbonate and 100 g of 1 3-bis(trifluoromethyl)benzene were put, and 6.4 g of propyl p-toluenesulfonate was added. The mixture was stirred at 80° C. for 8 hours under a nitrogen atmosphere. It was washed with dilute hydrochloric acid solution, and the organic layer was recovered and concentrated by an evaporator to obtain a crude product, which was purified by silica gel chromatography, to obtain a mixture containing 15.2 g, 55.3 g and 29.5 g, respectively, of the following compound (Q-1) of 0-functional species, compound (Q-2) of monofunctional species and compound (F-1) of bifunctional species.

CH$_3$CH$_2$CH$_2$OCH$_2$—(CF$_2$O){(CF$_2$O)$_n$(CF$_2$CF$_2$O)$_m$}—CF$_2$—CH$_2$OCH$_2$CH$_2$CH$_3$: (Q-1)

HOCH$_2$—(CF$_2$O){(CF$_2$O)$_n$(CF$_2$CF$_2$O)$_m$}—CF$_2$—CH$_2$OCH$_2$CH$_2$CH$_3$: (Q-2)

HOCH$_2$—(CF$_2$O){(CF$_2$O)$_n$·(CF$_2$CF$_2$O)$_m$}—CF$_2$—CH$_2$OH: (F-1)

(Separation Method)

Sample mixtures of Ex. 1 to 37 prepared as described above were separated by a column chromatography method.

In a column of 2 cm in diameter and 70 cm in height, a mixture of the solvent (200 g) to be used as the mobile phase and silica gel (50 g) was put, and then, 200 g of a solvent to be used as a mobile phase was permitted to flow to prepare a stationary phase.

Thereafter, a mixture of the sample mixture (10 g) from one of the above Ex. 1 to 37 and the solvent (5 g) to be used as the mobile phase was adsorbed onto the stationary phase at the top of the column. Then, from the top of the column, the solvent as the mobile phase was pushed down at N$_2$ pressure (gauge pressure) of 0.1 MPa, and 1,000 g of the solution was recovered as the first fraction. This recovered material was concentrated and analyzed by using high performance liquid chromatography (HPLC, manufactured by Shimadzu Corporation). Further, a solvent having the solvent used earlier as the mobile phase and acetone mixed in the mass ratio of 1:1, was pushed down, and 500 g of the solution was recovered as the second fraction. This was concentrated and analyzed by using HPLC.

The specific solvents used as the above mobile phase are as shown below.

Solvent 1: CF$_3$CF=CCl$_2$ (CFO)

Solvent 2: CFCl$_2$CF=CF$_2$ (CFO)

Solvent 3: CF$_2$HCF=CHCl(HCFO)

Solvent 4: CF$_3$CH=CHCl(Z) (HCFO)

Solvent 5: CF$_3$CH=CHCl(E) (HCFO)

Solvent 6: CClF$_2$CF=CHCl(HCFO)

Solvent 7: CHF$_2$CF$_2$CF$_2$CF=CHCl(HCFO)

Solvent 8: CF$_3$CH$_2$CF=CH$_2$ (HFO)

Solvent 9: CF$_3$CH=CHCF$_3$(E) (HFO)

Solvent 10: CF$_3$CH=CHCF$_3$(Z) (HFO)

Solvent 11: Compound of the following formula (cyclic HFC)

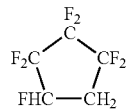

Solvent 12: Compound of the following formula (cyclic CFO)

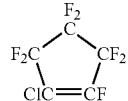

Solvent 13: Compound of the following formula (cyclic CFO)

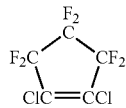

Solvent 14: $CF_3CF_2COCF(CF_3)_2$ (PFK)
Solvent 15: $(CF_3)_2CFCOCF(CF_3)_2$ (PFK)
Solvent 16: $CF_3CF_2CF_2OCFCF_3COCF(CF_3)_2$ (PFK)
Solvent 17: Mixed liquid of 95 wt % of $CF_3CF\!=\!CCl_2$ (CFO) and 5 wt % of hexane (hydrocarbon (HC))
Solvent 18: $C_6F_{14}$ (perfluorocarbon (PFC))
Solvent 19: Hexane (hydrocarbon (HC))
Solvent 20: ASAHIKLIN AK-225 (product name of AGC Inc., hydrochlorofluorocarbon (HCFC))

The main points in the separation with respect to the sample mixtures of the above Ex. 1 to 37 and the results obtained respectively are shown in the following Tables 1 to 3. Further, the yield in Table 3 represents the recovery rate (mass %) of each fraction relative to the charged mass (each component before separation).

TABLE 2

| | Before separation Concentration (wt %) of 0-, mono- and bi-functional species | | | | |
|---|---|---|---|---|---|
| Ex. | 0-functional species | monofunctional species | bifunctional species | Mobile phase | Type |
| 1 | 5.0 | 86.0 | 9.0 | Solvent 1 | CFO |
| 2 | 5.0 | 86.0 | 9.0 | Solvent 2 | CFO |
| 3 | 5.0 | 86.0 | 9.0 | Solvent 3 | HCFO |
| 4 | 5.0 | 86.0 | 9.0 | Solvent 4 | HCFO |
| 5 | 5.0 | 86.0 | 9.0 | Solvent 5 | HCFO |
| 6 | 5.0 | 86.0 | 9.0 | Solvent 6 | HCFO |
| 7 | 5.0 | 86.0 | 9.0 | Solvent 7 | HCFO |
| 8 | 5.0 | 86.0 | 9.0 | Solvent 8 | HFO |
| 9 | 5.0 | 86.0 | 9.0 | Solvent 9 | HFO |
| 10 | 5.0 | 86.0 | 9.0 | Solvent 10 | HFO |
| 11 | 5.0 | 86.0 | 9.0 | Solvent 11 | Cyclic HFC |
| 12 | 5.0 | 86.0 | 9.0 | Solvent 12 | Cyclic CFO |
| 13 | 5.0 | 86.0 | 9.0 | Solvent 13 | Cyclic CFO |
| 14 | 5.0 | 86.0 | 9.0 | Solvent 14 | PFK |
| 15 | 5.0 | 86.0 | 9.0 | Solvent 15 | PFK |
| 16 | 5.0 | 86.0 | 9.0 | Solvent 16 | PFK |
| 17 | 15.0 | 55.0 | 30.0 | Solvent 1 | CFO |
| 18 | 15.0 | 55.0 | 30.0 | Solvent 2 | CFO |
| 19 | 15.0 | 55.0 | 30.0 | Solvent 3 | HCFO |

TABLE 1

| Ex. | A- | —O-Z-(R)n | Repeating structure of main chain |
|---|---|---|---|
| 1 | Fluoroalkyl group | —O—$(CF_2)_3$—$CH_2OH$ | $(CF_2CF_2O\text{—}CF_2CF_2CF_2CF_2O)x$ |
| 2 | Fluoroalkyl group | —O—$(CF_2)_3$—$CH_2OH$ | $(CF_2CF_2O\text{—}CF_2CF_2CF_2CF_2O)x$ |
| 3 | Fluoroalkyl group | —O—$(CF_3)_3$—$CH_2OH$ | $(CF_2CF_2O\text{—}CF_2CF_2CF_2CF_2O)x$ |
| 4 | Fluoroalkyl group | —O—$(CF_2)_3$—$CH_2OH$ | $(CF_2CF_2O\text{—}CF_2CF_2CF_2CF_2O)x$ |
| 5 | Fluoroalkyl group | —O—$(CF_2)_3$—$CH_2OH$ | $(CF_2CF_2O\text{—}CF_2CF_2CF_2CF_2O)x$ |
| 6 | Fluoroalkyl group | —O—$(CF_2)_3$—$CH_2OH$ | $(CF_2CF_2O\text{—}CF_2CF_2CF_2CF_2O)x$ |
| 7 | Fluoroalkyl group | —O—$(CF_2)_3$—$CH_2OH$ | $(CF_2CF_2O\text{—}CF_2CF_2CF_2CF_2O)x$ |
| 8 | Fluoroalkyl group | —O—$(CF_2)_3$—$CH_2OH$ | $(CF_2CF_2O\text{—}CF_2CF_2CF_2CF_2O)x$ |
| 9 | Fluoroalkyl group | —O—$(CF_2)_3$—$CH_2OH$ | $(CF_2CF_2O\text{—}CF_2CF_2CF_2CF_2O)x$ |
| 10 | Fluoroalkyl group | —O—$(CF_2)_3$—$CH_2OH$ | $(CF_2CF_2O\text{—}CF_2CF_2CF_2CF_2O)x$ |
| 11 | Fluoroalkyl group | —O—$(CF_2)_3$—$CH_2OH$ | $(CF_2CF_2O\text{—}CF_2CF_2CF_2CF_2O)x$ |
| 12 | Fluoroalkyl group | —O—$(CF_2)_3$—$CH_2OH$ | $(CF_2CF_2O\text{—}CF_2CF_2CF_2CF_2O)x$ |
| 13 | Fluoroalkyl group | —O—$(CF_2)_3$—$CH_2OH$ | $(CF_2CF_2O\text{—}CF_2CF_2CF_2CF_2O)x$ |
| 14 | Fluoroalkyl group | —O—$(CF_2)_3$—$CH_2OH$ | $(CF_2CF_2O\text{—}CF_2CF_2CF_2CF_2O)x$ |
| 15 | Fluoroalkyl group | —O—$(CF_2)_3$—$CH_2OH$ | $(CF_2CF_2O\text{—}CF_2CF_2CF_2CF_2O)x$ |
| 16 | Fluoroalkyl group | —O—$(CF_2)_3$—$CH_2OH$ | $(CF_2CF_2O\text{—}CF_2CF_2CF_2CF_2O)x$ |
| 17 | Fluoroalkyl group | —O—$(CF_2)$—$CH_2OH$ | $(CF_2O)n\text{—}(CF_2CF_2O)m$ |
| 18 | Fluoroalkyl group | —O—$(CF_2)$—$CH_2OH$ | $(CF_2O)n\text{—}(CF_2CF_2O)m$ |
| 19 | Fluoroalkyl group | —O—$(CF_2)$—$CH_2OH$ | $(CF_2O)n\text{—}(CF_2CF_2O)m$ |
| 20 | Fluoroalkyl group | —O—$(CF_2)$—$CH_2OH$ | $(CF_2O)n\text{—}(CF_2CF_2O)m$ |
| 21 | Fluoroalkyl group | —O—$(CF_2)$—$CH_2OH$ | $(CF_2O)n\text{—}(CF_2CF_2O)m$ |
| 22 | Fluoroalkyl group | —O—$(CF_2)$—$CH_2OH$ | $(CF_2O)n\text{—}(CF_2CF_2O)m$ |
| 23 | Fluoroalkyl group | —O—$(CF_2)$—$CH_2OH$ | $(CF_2O)n\text{—}(CF_2CF_2O)m$ |
| 24 | Fluoroalkyl group | —O—$(CF_2)$—$CH_2OH$ | $(CF_2O)n\text{—}(CF_2CF_2O)m$ |
| 25 | Fluoroalkyl group | —O—$(CF_2)$—$CH_2OH$ | $(CF_2O)n\text{—}(CF_2CF_2O)m$ |
| 26 | Fluoroalkyl group | —O—$(CF_2)_3$—$O(OH)(CH_2CH\!=\!CH_2)_2$ | $(CF_2CF_2O\text{—}CF_2CF_2CF_2CF_2O)x$ |
| 27 | Fluoroalkyl group | —O—$(CF_2)_3$—$COOCH_3$ | $(CF_2CF_2O\text{—}CF_2CF_2CF_2CF_2O)x$ |
| 28 | Fluoroalkyl group | —O—$(CF_2)_3$—$CH_2OC(\!=\!O)C(CH_2CH\!=\!CH_2)_2$ | $(CF_2CF_2O\text{—}CF_2CF_2CF_2CF_2O)x$ |
| 29 | Fluoroalkyl group | —O—$(CF_2)_3$—$CONHCH_2C(CH_2CH\!=\!CH_2)_3$ | $(CF_2CF_2O\text{—}CF_2CF_2CF_2CF_2O)x$ |
| 30 | Fluoroalkyl group | —O—$(CF_2)_3$—$CONH_2$ | $(CF_2CF_2O\text{—}CF_2CF_2CF_2CF_2O)x$ |
| 31 | Fluoroalkyl group | —O—$(CF_2)_3$—$CH_2NHCOC(CH_2CH\!=\!CH_2)_3$ | $(CF_2CF_2O\text{—}CF_2CF_2CF_2CF_2O)x$ |
| 32 | Fluoroalkyl group | —O—$(CF_2)$—$CH_2OH$ | $(CF_2O)n\text{—}(CF_2CF_2O)m$ |
| 33 | Fluoroalkyl group | —O—$(CF_2)_3$—$CH_2OH$ | $(CF_2CF_2O\text{—}CF_2CF_2CF_2CF_2O)x$ |
| 34 | Alkyl group | —O—$(CF_2)$—$CH_2OH$ | $(CF_2O)n\text{—}(CF_2CF_2O)m$ |
| 35 | Fluoroalkyl group | —O—$(CF_2)_3$—$CH_2OH$ | $(CF_2CF_2O\text{—}CF_2CF_2CF_2CF_2O)x$ |
| 36 | Fluoroalkyl group | —O—$(CF_2)_3$—$CH_2OH$ | $(CF_2CF_2O\text{—}CF_2CF_2CF_2CF_2O)x$ |
| 37 | Fluoroalkyl group | —O—$(CF_2)_3$—$CH_2OH$ | $(CF_2CF_2O\text{—}CF_2CF_2CF_2CF_2O)x$ |

TABLE 2-continued

| | Before separation Concentration (wt %) of 0-, mono- and bi-functional species | | | | |
|---|---|---|---|---|---|
| Ex. | 0-functional species | monofunctional species | bifunctional species | Mobile phase | Type |
| 20 | 15.0 | 55.0 | 30.0 | Solvent 4 | HCFO |
| 21 | 15.0 | 55.0 | 30.0 | Solvent 5 | HCFO |
| 22 | 15.0 | 55.0 | 30.0 | Solvent 6 | HCFO |
| 23 | 15.0 | 55.0 | 30.0 | Solvent 7 | HCFO |
| 24 | 15.0 | 55.0 | 30.0 | Solvent 8 | HFO |
| 25 | 15.0 | 55.0 | 30.0 | Solvent 11 | Cyclic HFC |
| 26 | 5.0 | 86.0 | 9.0 | Solvent 1 | CFO |
| 27 | 5.0 | 86.0 | 9.0 | Solvent 1 | CFO |
| 28 | 5.0 | 86.0 | 9.0 | Solvent 1 | CFO |
| 29 | 5.0 | 86.0 | 9.0 | Solvent 1 | CFO |
| 30 | 5.0 | 86.0 | 9.0 | Solvent 1 | CFO |
| 31 | 5.0 | 86.0 | 9.0 | Solvent 1 | CFO |
| 32 | 5.0 | 86.0 | 9.0 | Solvent 1 | CFO |
| 33 | 5.0 | 86.0 | 9.0 | Solvent 17 | CFO, HC |
| 34 | 15.2 | 55.3 | 29.5 | Solvent 1 | CFO |
| 35 | 5.0 | 86.0 | 9.0 | Solvent 18 | PFC |
| 36 | 5.0 | 86.0 | 9.0 | Solvent 19 | HC |
| 37 | 5.0 | 86.0 | 9.0 | Solvent 20 | HCFO |

As shown in Tables 1 to 3, in Ex. 1 to 34 wherein CFO, HCFO, HFO, cyclic HFC, cyclic CFO or PFK was used as a mobile phase, the yields of fluorinated compounds were high, and in the first fraction, monofunctional species could be separated with high purity, and in the second fraction, bifunctional species could be separated with high purity.

Among them, in Ex. 1 to 13 and 17 to 25 wherein CFO, HCFO, HFO, cyclic HFC or cyclic CFO was used, the purity of monofunctional species in the first fraction was high, and the purity of bifunctional species in the second fraction was high. In Ex. 1, 2, 8 to 13, 17, 18, 24 to 25 wherein CFO, HFO, cyclic HFC or cyclic CFO was used, the purity of monofunctional species in the first fraction was higher, and the purity of bifunctional species in the second fraction was higher. In Ex. 8 to 11, 24 and 25 wherein HFO or cyclic HFC was used, the purity of monofunctional species in the first fraction was further higher, and the purity of bifunctional species in the second fraction was further higher.

In Ex. 33 wherein a mixed solvent of CFO and HC was used, monofunctional species in the first fraction could be separated with high purity, but the yield was lower.

Focusing on the main chain of the fluorinated compound, in Ex. 17 to 25, 32 and 34 wherein fluorinated compounds

TABLE 3

| | First fraction | | | | Second fraction | | | |
|---|---|---|---|---|---|---|---|---|
| | Concentration (wt %) of 0-, mono- and bi-functional species | | | | Concentration (wt %) of 0-, mono- and bi-functional species | | | |
| Ex. | 0-functional species | Mono-functional species | Bi-functional species | Yield | 0-functional species | Mono-functional species | Bi-functional species | Yield |
| 1 | 5.4 | 92.8 | 1.8 | 92.2 | 0.3 | 5.6 | 94.1 | 6.6 |
| 2 | 5.4 | 93.6 | 1.0 | 91.5 | 0.7 | 4.2 | 95.1 | 7.2 |
| 3 | 5.4 | 92.4 | 2.2 | 92.4 | 0.1 | 8.2 | 91.7 | 5.8 |
| 4 | 5.3 | 91.9 | 2.8 | 93.0 | 1.0 | 7.6 | 91.4 | 5.9 |
| 5 | 5.3 | 91.8 | 2.9 | 92.9 | 1.1 | 10.1 | 88.8 | 5.8 |
| 6 | 5.3 | 92.5 | 2.2 | 92.4 | 1.4 | 7.0 | 91.7 | 6.2 |
| 7 | 5.3 | 92.1 | 2.6 | 92.8 | 1.1 | 7.4 | 91.5 | 6.1 |
| 8 | 5.4 | 94.0 | 0.6 | 91.4 | 0.7 | 0.5 | 98.7 | 7.4 |
| 9 | 5.4 | 93.9 | 0.7 | 91.5 | 0.7 | 0.7 | 98.6 | 6.7 |
| 10 | 5.3 | 94.1 | 0.6 | 91.3 | 1.8 | 0.6 | 97.6 | 6.8 |
| 11 | 5.4 | 94.2 | 0.4 | 91.2 | 0.8 | 0.7 | 98.5 | 7.3 |
| 12 | 5.3 | 93.5 | 1.2 | 91.5 | 1.8 | 5.3 | 93.0 | 7.1 |
| 13 | 5.4 | 93.4 | 1.2 | 91.6 | 0.6 | 5.3 | 94.1 | 6.6 |
| 14 | 5.1 | 91.6 | 3.3 | 92.0 | 3.9 | 21.6 | 74.6 | 6.6 |
| 15 | 5.3 | 91.3 | 3.4 | 92.1 | 1.5 | 24.2 | 74.3 | 6.7 |
| 16 | 5.4 | 91.4 | 3.2 | 92.0 | 0.4 | 23.9 | 75.7 | 6.2 |
| 17 | 21.5 | 77.2 | 1.3 | 69.0 | 0.5 | 5.6 | 93.9 | 29.6 |
| 18 | 21.6 | 76.8 | 1.6 | 69.1 | 0.2 | 6.2 | 93.5 | 29.8 |
| 19 | 21.5 | 76.2 | 2.3 | 68.0 | 1.2 | 9.9 | 88.9 | 30.5 |
| 20 | 21.4 | 76.6 | 2.0 | 67.5 | 1.7 | 10.1 | 88.2 | 30.9 |
| 21 | 21.5 | 75.8 | 2.7 | 67.9 | 1.3 | 11.0 | 87.7 | 30.9 |
| 22 | 21.4 | 75.7 | 2.9 | 68.3 | 1.2 | 10.4 | 88.4 | 29.9 |
| 23 | 21.5 | 76.0 | 2.8 | 68.1 | 1.1 | 10.2 | 88.7 | 30.6 |
| 24 | 21.4 | 78.1 | 0.5 | 70.0 | 0.1 | 1.1 | 98.8 | 28.3 |
| 25 | 21.4 | 77.9 | 0.7 | 69.8 | 0.2 | 2.1 | 97.7 | 28.7 |
| 26 | 5.4 | 93.7 | 0.9 | 91.3 | 0.8 | 5.2 | 94.0 | 7.0 |
| 27 | 5.3 | 91.4 | 3.3 | 93.5 | 0.7 | 8.3 | 91.0 | 5.3 |
| 28 | 5.3 | 91.2 | 3.5 | 93.6 | 0.6 | 10.0 | 89.4 | 4.6 |
| 29 | 5.4 | 93.7 | 0.9 | 91.5 | 0.7 | 3.1 | 96.2 | 6.7 |
| 30 | 5.4 | 93.9 | 0.7 | 91.2 | 0.9 | 4.1 | 95.0 | 7.1 |
| 31 | 5.4 | 93.9 | 0.7 | 91.1 | 0.9 | 5.1 | 94.0 | 7.3 |
| 32 | 5.4 | 94.3 | 0.3 | 90.8 | 0.2 | 0.6 | 99.2 | 8.0 |
| 33 | 5.5 | 93.7 | 0.8 | 88.8 | 1.4 | 7.1 | 91.5 | 7.4 |
| 34 | 20.2 | 74.3 | 5.5 | 57.2 | 4.3 | 17.5 | 78.2 | 31.8 |
| 35 | 45.2 | 51.0 | 3.8 | 0.2 | 40.2 | 55.4 | 4.4 | 0.8 |
| 36 | 53.5 | 44.1 | 2.4 | 0.1 | 38.5 | 54.3 | 7.2 | 0.2 |
| 37 | 5.2 | 86.5 | 8.3 | 93.0 | 2.3 | 79.4 | 18.3 | 5.0 | of the Fomblin type with the main chain being $(CF_2O)_n \cdot (CF_2CF_2O)_m$ were used, separation capacity for monofunctional species in the first fraction was high, and the separation capacity for bifunctional species in the second fraction was high.

Focusing on $—O—Z—(R)_n$ of the fluorinated compound, in Ex. 1 to 25 and 32 to 37 for $—O—(CF_2)_3—CH_2OH$, in Ex. 29 for $—O—(CF_2)_3—CONHCH_2C(CH_2CH=CH_2)_3$, in Ex. 30 for $—O—(CF_2)_3—CONH_2$, and in Ex. 31 for $—O—(CF_2)_3—CH_2NHCOC(CH_2CH=CH_2)_3$, the purity of monofunctional species in the first fraction was high, and the purity of bifunctional species in the second fraction was high. In Ex. 34 wherein A is an alkyl group, as compared with Ex. 17 wherein A is a perfluoroalkyl group, the purity and yield of monofunctional species in the first fraction were slightly lower.

This application is a continuation of PCT Application No. PCT/JP2021/033805, filed on Sep. 14, 2021, which is based upon and claims the benefit of priority from Japanese Patent Application No. 2020-155413 filed on Sep. 16, 2020. The contents of those applications are incorporated herein by reference in their entireties.

What is claimed is:

1. A separation method for separating a compound represented by the following formula (1) and a compound represented by the following formula (2) from a mixture containing them by chromatography using a mobile phase and a stationary phase, which comprises
    a step of supplying the mixture to the stationary phase of the chromatography to let it be adsorbed on the stationary phase, and
    a step of supplying, to the stationary phase having the mixture adsorbed thereon, a mobile phase containing at least one type of specific solvent selected from the group consisting of a hydrofluoroolefin, a hydrochlorofluoroolefin, a chlorofluoroolefin, a cyclic hydrofluoroolefin, a cyclic hydrochlorofluoroolefin, a cyclic chlorofluoroolefin, a cyclic hydrofluorocarbon, a cyclic chlorofluorocarbon and a perfluoroketone:

  Formula (1)

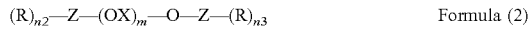  Formula (2)

where
A is an alkyl group or a fluoroalkyl group,
X is an alkylene group or a fluoroalkylene group having one or more fluorine atoms,
m is an integer of 2 or more,
Z is a (n1+1)-valent, (n2+1)-valent or (n3+1)-valent linking group,
R is any functional group selected from the group consisting of $—OH$, $—CR^1=CR^2R^3$ (where $R^1$ is a hydrogen atom, a fluorine atom, a methyl group or a trifluoromethyl group, and $R^2$ and $R^3$ are each independently a hydrogen atom or a fluorine atom), $—CH_3$, $—NH_2$, $—SH$, -Ph, $—F$, $—Cl$, $—Br$, $—I$, $—C\equiv CH$ and $—N_3$,
n1 is an integer of 1 or more,
n2 is an integer of 1 or more, and
n3 is an integer of 1 or more.

2. The separation method according to claim 1, wherein in the above formulas (1) and (2), A is a fluoroalkyl group, and X is a fluoroalkylene group having one or more fluorine atoms.

3. The separation method according to claim 1, wherein in the above formulas (1) and (2), n1, n2 and n3 are the same integers.

4. The separation method according to claim 1, wherein the mixture further contains a compound represented by the following formula (3), and it is separated into the compound represented by the formula (1), the compound represented by the formula (2), and the compound represented by the formula (3):

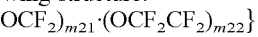  Formula (3)

where A, X, and m are the same as those in the above formulas (1) and (2).

5. The separation method according to claim 1, wherein the specific solvent is a solvent that does not contain chlorine atoms.

6. The separation method according to claim 1, wherein the specific solvent includes at least one type selected from the group consisting of a hydrofluoroolefin, a cyclic hydrofluoroolefin and a cyclic hydrofluorocarbon.

7. The separation method according to claim 1, wherein in the above formulas (1), (2) and (3), $(OX)_m$ contains the following structure:
where m21 is an integer of 1 or more, m22 is an integer of 1 or more, and m21+m22 is an integer of from 2 to 500.

8. The separation method according to claim 1, wherein the stationary phase is selected from the group consisting of aluminum oxide, silica gel, magnesium oxide, aluminum silicate, magnesium silicate, chemically modified silica gel and diatomaceous earth.

9. The separation method according to claim 1, wherein the chromatography is column chromatography.

* * * * *